United States Patent
Hsueh et al.

(10) Patent No.: US 10,241,301 B2
(45) Date of Patent: Mar. 26, 2019

(54) OPTICAL IMAGING LENS ASSEMBLY, IMAGE CAPTURING APPARATUS AND ELECTRONIC DEVICE

(71) Applicant: LARGAN PRECISION CO., LTD., Taichung (TW)

(72) Inventors: Chun-Che Hsueh, Taichung (TW); Shu-Yun Yang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 346 days.

(21) Appl. No.: 15/284,990

(22) Filed: Oct. 4, 2016

(65) Prior Publication Data

US 2018/0011293 A1    Jan. 11, 2018

(30) Foreign Application Priority Data

Jul. 5, 2016    (TW) .............................. 105121205 A

(51) Int. Cl.
| | | |
|---|---|---|
| G02B 9/62 | (2006.01) | |
| G02B 13/00 | (2006.01) | |
| G02B 5/00 | (2006.01) | |
| G02B 27/00 | (2006.01) | |

(52) U.S. Cl.
CPC .......... *G02B 13/0045* (2013.01); *G02B 5/005* (2013.01); *G02B 9/62* (2013.01); *G02B 13/006* (2013.01); *G02B 27/0025* (2013.01)

(58) Field of Classification Search
USPC ....... 359/642, 658, 708, 713, 745, 750–752, 359/754–756, 761, 762
See application file for complete search history.

(56) References Cited

U.S. PATENT DOCUMENTS

| 2,423,267 A | 7/1947 | Strang | |
|---|---|---|---|
| 2009/0296234 A1* | 12/2009 | Asami | G02B 13/04 |
| | | | 359/713 |
| 2012/0170142 A1* | 7/2012 | Hsieh | G02B 9/62 |
| | | | 359/762 |

(Continued)

FOREIGN PATENT DOCUMENTS

| CN | 204462511 U | 7/2015 |
|---|---|---|
| JP | 1994034891 | 2/1994 |

(Continued)

*Primary Examiner* — Ricky L Mack
*Assistant Examiner* — Gary W O'Neill
(74) *Attorney, Agent, or Firm* — Locke Lord LLP; Tim Tingkang Xia, Esq.

(57) ABSTRACT

The present disclosure provides an optical imaging lens assembly comprising, in order from an object side to an image side: a first lens element having negative refractive power; a second lens element with negative refractive power having an object-side surface being convex in a paraxial region thereof and an image-side surface being concave in a paraxial region thereof; a third lens element having positive refractive power; a fourth lens element having positive refractive power; a fifth lens element having positive refractive power; and a sixth lens element; wherein the optical imaging lens assembly has a total of six lens elements. With such configuration, the optical imaging lens assembly of the present disclosure is characterized by a a wide field of view, a compact size and high image quality.

25 Claims, 24 Drawing Sheets

(56) References Cited

U.S. PATENT DOCUMENTS

| | | | |
|---|---|---|---|
| 2013/0094100 A1* | 4/2013 | Peng | G02B 13/04 |
| | | | 359/723 |
| 2013/0235176 A1 | 9/2013 | Miyano | |
| 2015/0260952 A1* | 9/2015 | Tang | H04N 5/2252 |
| | | | 348/373 |
| 2015/0338613 A1 | 11/2015 | Tang et al. | |
| 2015/0362702 A1 | 12/2015 | Tang et al. | |

FOREIGN PATENT DOCUMENTS

| | | |
|---|---|---|
| JP | 2007139985 A | 6/2007 |
| JP | 2013088805 A | 5/2013 |
| JP | 2016014754 A | 1/2016 |
| WO | 2012057021 A1 | 5/2012 |

* cited by examiner

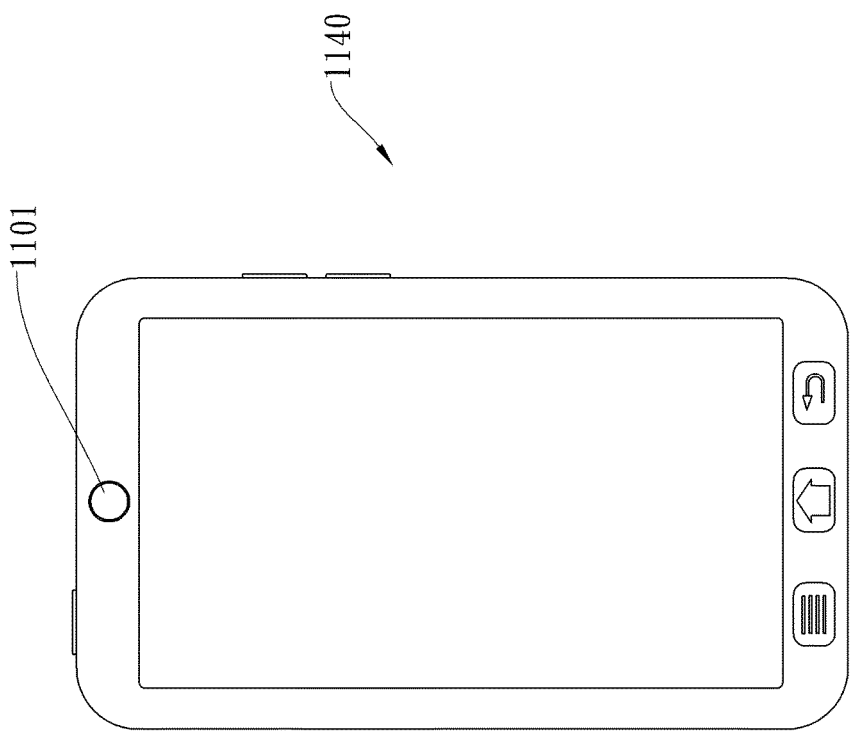

OPTICAL IMAGING LENS ASSEMBLY, IMAGE CAPTURING APPARATUS AND ELECTRONIC DEVICE

RELATED APPLICATIONS

This application claims priority to Taiwan Application Serial Number 105121205, filed on Jul. 5, 2016, which is incorporated by reference herein in its entirety.

BACKGROUND

Technical Field

The present disclosure relates to an optical imaging lens assembly and an image capturing apparatus, and more particularly, to an optical imaging lens assembly and an image capturing apparatus applicable to electronic devices.

Description of Related Art

As photographing modules are being used in a wider variety of applications, they must fulfill more demanding specifications to suit more diversified needs. Nowadays, market demand for photographing modules with more compact sizes and higher image quality is increasing. Also, in order to capture images covering wider areas, there is a trend towards equipping photographing modules with a wider field of view. In addition, to allow photographing modules to perform optimally in various environments, extreme temperature resistance is becoming a necessary feature for these modules. In view of the foregoing, a photographing module featuring a wide field of view, a compact size, extreme temperature resistance, and high image quality should be developed immediately to fulfill possible specification demands and utilization needs from the market. Applications for such a photographing module may include: head-mounted displays, motion sensing devices, car cameras, night vision cameras, various smart devices, surveillance security systems, sports and action cameras, portable electronic devices, drone cameras, etc.

SUMMARY

According to one aspect of the present disclosure, there is provided an optical imaging lens assembly comprising, in order from an object side to an image side: a first lens element having negative refractive power; a second lens element with negative refractive power having an object-side surface being convex in a paraxial region thereof and an image-side surface being concave in a paraxial region thereof; a third lens element having positive refractive power; a fourth lens element having positive refractive power; a fifth lens element having positive refractive power; and a sixth lens element having negative refractive power; wherein the optical imaging lens assembly has a total of six lens elements; and wherein a central thickness of the second lens element is CT2, a central thickness of the third lens element is CT3, a focal length of the optical imaging lens assembly is f, an axial distance between the first lens element and the second lens element is T12, an axial distance between the image-side surface of the sixth lens element and an image surface is BL, a sum of axial distances between respective two adjacent lens elements of the optical imaging lens assembly is $\Sigma AT$, an entrance pupil diameter of the optical imaging lens assembly is EPD, and the following conditions are satisfied:

$0 < CT3/CT2 < 1.0;$ $0 < f/T12 < 5.50;$ $0.15 < BL/\Sigma AT < 1.70;$ and $0.80 < f/EPD < 5.0.$ According to another aspect of the present disclosure, there is provided an image capturing apparatus comprising the aforementioned optical imaging lens assembly and an image sensor.

According to yet another aspect of the present disclosure, there is provided an electronic device comprising the aforementioned image capturing apparatus.

According to still another aspect of the present disclosure, there is provided an optical imaging lens assembly comprising, in order from an object side to an image side: a first lens element having negative refractive power; a second lens element with negative refractive power having an object-side surface being convex in a paraxial region thereof and an image-side surface being concave in a paraxial region thereof; a third lens element having positive refractive power; a fourth lens element having positive refractive power; a fifth lens element having positive refractive power; and a sixth lens element; wherein the optical imaging lens assembly has a total of six lens elements; and wherein a central thickness of the second lens element is CT2, a central thickness of the third lens element is CT3, a central thickness of the fourth lens element is CT4, a focal length of the optical imaging lens assembly is f, an axial distance between the first lens element and the second lens element is T12, an axial distance between the second lens element and the third lens element is T23, and the following conditions are satisfied:

$0 < CT3/CT2 < 1.0;$ $0 < f/T12 < 2.60;$ and $0.70 < CT4/T23 < 15.0.$

The first lens element having negative refractive power is favorable for forming a retro-focus structure, thereby allowing light with a larger incident angle to enter the optical imaging lens assembly. The second lens element having negative refractive power can share the negative refractive power of the first lens element, thereby mitigating light incident on the first lens element with a larger incident angle. Moreover, the second lens element having an object-side surface being convex in a paraxial region thereof and an image-side surface being concave in a paraxial region thereof is favorable for correcting aberration and reducing sensitivity of the system, thereby improving the image quality of the optical imaging lens assembly. The needs for a wide field of view and high image quality can thus be satisfied.

The third lens element having positive refractive power can balance the negative refractive power that the lens elements at the object side of the optical imaging lens assembly have, thereby guiding the passage of light effectively. The fourth and fifth lens elements having positive refractive power can provide the main convergence capability of the system, thereby reducing the total track length of the optical imaging lens assembly and satisfying the need for a compact size.

When CT3/CT2 satisfies the above condition, the proportion of the thickness of the second lens element to that of the third lens element can be properly controlled, which is favorable for mitigating light with a larger incident angle and consequently reducing the sensitivity of the optical imaging lens assembly at the object side, and is also favorable for forming the lens elements and reducing the residual stresses therein, and the image quality can be improved consequently. When f/T12 satisfies the above conditions, the optical imaging lens assembly can be more prominently characterized by a wide field of view with a short focal length, and the axial distance between the first lens element and the second lens element can be properly adjusted, which is favorable for an easier assembling process. When BL/ΣAT satisfies the above condition, the proportion of the back focal length of the optical imaging lens assembly to the sum of axial distances between respective two adjacent lens elements can be properly allocated, which is favorable for an easier assembling process and also favorable for effectively controlling the total track length of the optical imaging lens assembly. When f/EPD satisfies the above condition, the amount of light entering the optical imaging lens assembly can be effectively controlled, which is favorable for increasing illuminance on the image surface. When CT4/T23 satisfies the above condition, the thickness of the fourth lens element and the axial distance between the second and the third lens elements can be properly adjusted, which is favorable for an easier assembling process and also favorable for providing the image side of the optical imaging lens assembly with sufficient convergence capability, thereby reducing the total track length of the optical imaging lens assembly effectively.

BRIEF DESCRIPTION OF THE DRAWINGS

FIG. 11D shows a smart phone with an image capturing apparatus of the present disclosure installed therein.

DETAILED DESCRIPTION

Figure 1A:
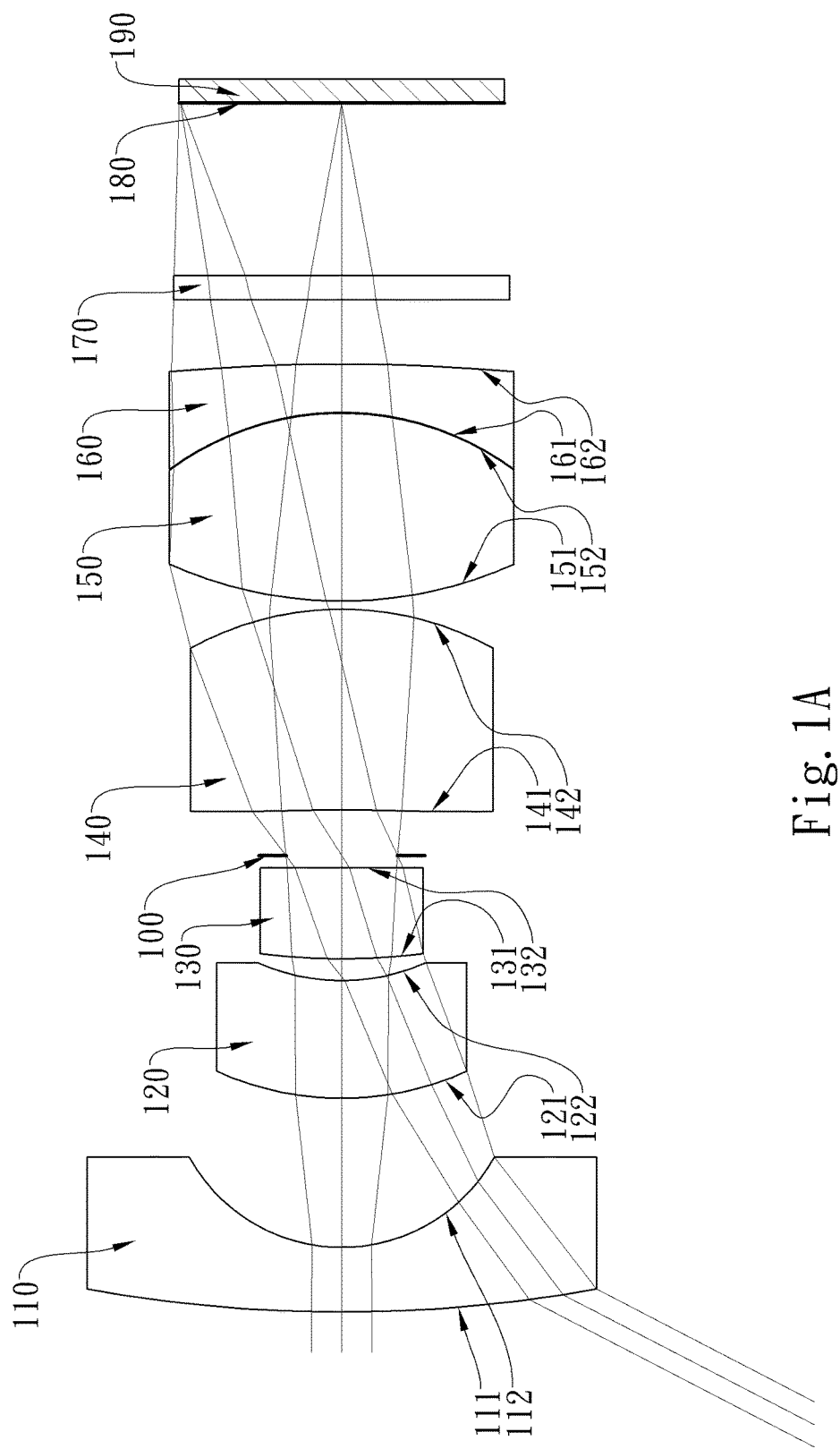
FIG. 1A is a schematic view of an image capturing apparatus according to the 1st embodiment of the present disclosure.

The present disclosure provides an optical imaging lens assembly comprising, from an object side to an image side, a first lens element, a second lens element, a third lens element, a fourth lens element, a fifth lens element and a sixth lens element.

The first lens element having negative refractive power is favorable for forming a retro-focus structure, thereby allowing light with a larger incident angle to enter the optical imaging lens assembly.

The second lens element having negative refractive power can share the negative refractive power of the first lens element, thereby mitigating light incident on the first lens element with a larger incident angle. Moreover, the second lens element having an object-side surface being convex in a paraxial region thereof and an image-side surface being concave in a paraxial region thereof is favorable for correcting aberration and reducing the sensitivity of the system, thereby improving the image quality of the optical imaging lens assembly.

The third lens element having positive refractive power can balance the negative refractive power that the lens elements at the object side of the optical imaging assembly have and guide the passage of light effectively.

The fourth and the fifth lens elements having positive refractive power can provide the main convergence capability of the system and is favorable for reducing the total track length of the optical imaging lens assembly.

When a central thickness of the second lens element is CT2, a central thickness of the third lens element is CT3, and the following condition is satisfied: 0<CT3/CT2<1.0, the proportion of the thickness of the second lens element to that of the third lens element can be properly controlled, which is favorable for mitigating light with a larger incident angle and consequently reducing the sensitivity of the optical imaging lens assembly at the object side, and is also favorable for forming the lens elements and reducing the residual stresses therein, and the image quality can be improved consequently.

When a focal length of the optical imaging lens assembly is f, an axial distance between the first lens element and the second lens element is T12, and the following condition is satisfied: 0<f/T12<5.50, the optical imaging lens assembly can be more prominently characterized by a wide field of view with a short focal length, and the axial distance between the first and the second lens elements can be properly adjusted, which is favorable for an easier assembling process. Preferably, the following condition is satisfied: 0<f/T12<2.60.

When an axial distance between the image-side surface of the sixth lens element and an image surface is BL, a sum of axial distances between respective two adjacent lens elements of the optical imaging lens assembly is ΣAT, and the following condition is satisfied: 0.15<BL/ΣAT<1.70, the proportion of the back focal length of the optical imaging lens assembly to the sum of axial distances between respective two adjacent lens elements can be properly allocated, which is favorable for an easier assembling process and also favorable for effectively controlling the total track length of the optical imaging lens assembly. To be more specific, ΣAT is a sum of the axial distance between the first lens element and the second lens element, an axial distance between the second lens element and the third lens element, an axial distance between the third lens element and the fourth lens element, an axial distance between the fourth lens element and the fifth lens element, and an axial distance between the fifth lens element and the sixth lens element.

When the focal length of the optical imaging lens assembly is f, an entrance pupil diameter of the optical imaging lens assembly is EPD, and the following condition is satisfied: 0.80<f/EPD<5.0, therefore the amount of light entering the optical imaging lens assembly can be effectively controlled, which is favorable for increasing illuminance on the image surface. Preferably, the following condition is satisfied: 1.20<f/EPD<4.0.

When a central thickness of the fourth lens element is CT4, an axial distance between the second lens element and the third lens element is T23, and the following condition is satisfied: 0.70<CT4/T23<15.0, the thickness of the fourth lens element and the axial distance between the second and the third lens elements can be properly adjusted, which is favorable for an easier assembling process and also favorable for providing the image side of the optical imaging lens assembly with sufficient convergence capability, thereby reducing the total track length of the optical imaging lens assembly effectively.

When the axial distance between the first lens element and the second lens element is T12, the first lens element has an image-side surface being concave in a paraxial region thereof, and T12 is the maximum axial distance among the axial distances between respective two adjacent lens elements, that is to say, the axial distance between the first lens element and the second lens element is larger than respectively the axial distance between the second lens element and the third lens element, the axial distance between the third lens element and the fourth lens element, the axial distance between the fourth lens element and the fifth lens element, and the axial distance between the fifth lens element and the sixth lens element. In this case, the optical imaging lens assembly has a retro-focus structure that is favorable for light with a larger incident angle to enter the optical imaging lens assembly and allows more flexibility in arranging optical components at the object side of the optical imaging lens assembly.

When a curvature radius of the object-side surface of the fourth lens element is R7, a curvature radius of the image-side surface of the fourth lens element is R8, and the following condition is satisfied: −0.30<(R7+R8)/(R7−R8)<5.0, the shape of the fourth lens element can be properly controlled to increase the symmetry of the optical imaging lens assembly, and light rays entering the optical imaging lens assembly can converge more favorably.

When a curvature radius of the object-side surface of the first lens element is R1, a curvature radius of the image-side surface of the sixth lens element is R12, and the following condition is satisfied: −1.3<(R1+R12)/(R1−R12)<0.10, the curvatures at both the object side and image side of the optical imaging lens assembly can be properly arranged, which is favorable for receiving light with a larger incident angle.

When a curvature radius of the object-side surface of the sixth lens element is R11, the curvature radius of the image-side surface of the sixth lens element is R12, and the following condition is satisfied: −0.20<R11/R12<0.34, the angle between the surface of the sixth lens element and light can be properly controlled to prevent stray light from being generated at the image side of the optical imaging lens assembly, and the image quality can be improved accordingly.

When the axial distance between the second lens element and the third lens element is T23, an axial distance between the fourth lens element and the fifth lens element is T45, and the following condition is satisfied: 0.10<T23/T45<3.50, the axial distances between respective two lens elements from the object side to the image side of the optical imaging lens assembly can be more balanced, which can help increase the symmetry of the system and thereby reduces the sensitivity of the optical imaging lens assembly.

When a curvature radius of the image-side surface of the second lens element is R4, a curvature radius of the object-side surface of the third lens element is R5, and the following condition is satisfied: |R4/R5|<0.90, the curvatures of the image-side surface of the second lens element and the object-side surface of the third lens element can be properly adjusted, which can help guide the passage of light with a larger incident angle.

When an Abbe number of the second lens element is V2, an Abbe number of the third lens element is V3, and the following condition is satisfied: (V2+V3)/2<33.5, it can help correct chromatic aberration of the optical imaging lens assembly and mitigate light incident on the first lens element with a larger incident angle.

When half of a maximum field of view of the optical imaging lens assembly is HFOV, and the following condition is satisfied: |1/tan(HFOV)|<0.85, the field of view can be effectively increased, and the optical imaging lens assembly can be applied to a wider range of products accordingly.

When the optical imaging lens assembly further comprises an aperture stop, an axial distance between the aperture stop and the image-side surface of the sixth lens element is SD, an axial distance between the object-side surface of the first lens element and the image-side surface of the sixth lens element is TD, and the following condition is satisfied: 0.25<SD/TD<0.58, the position of the aperture stop can be balanced, which can help increase the symmetry of the system and allow the optical imaging lens assembly to have a wide field of view while achieving high image quality.

When a wavelength of incident light entering the optical imaging lens assembly is λ, and the following condition is satisfied: 750 nm<λ<950 nm, it is favorable for the optical imaging lens assembly to detect radiation emitted by the human body and to detect human motions concurrently, or even use the detection results to calculate distances in the space.

When the curvature radius of the object-side surface of the first lens element is R1, a curvature radius of the image-side surface of the first lens element is R2, and the following condition is satisfied: 0<(R1+R2)/(R1−R2)<2.50, it is favorable for forming a retro-focus structure that allows light with a larger incident angle to enter the optical imaging lens assembly.

When a curvature radius of the object-side surface of the fifth lens element is R9, the curvature radius of the image-side surface of the sixth lens element is R12, and the following condition is satisfied: −1.80<(R9+R12)/(R9−R12)<0.55, the curvatures of the object-side surface of the fifth lens element and the image-side surface of the sixth lens element can be properly arranged to facilitate the control of the back focal length and thus reduce the total track length.

When a sum of central thicknesses of the first lens element, the second lens element, the third lens element, the fourth lens element, the fifth lens element, and the sixth lens element is ΣCT, the sum of axial distances between respective two adjacent lens elements of the optical imaging lens assembly is ΣAT, and the following condition is satisfied: 0.40<ΣCT/ΣAT<6.80, the proportion of the lens elements in the optical imaging lens assembly can be properly allocated, which is favorable for an easier assembling process and can help reduce the sensitivity of the optical imaging lens assembly.

When a focal length of the second lens element is f2, a focal length of the fifth lens element is f5, and the following condition is satisfied: 1.70<|f2/f5|<8.0, the refractive power distribution of the second lens element and the fifth lens element can be properly adjusted, which is favorable for enhancing the wide-angle feature of the optical imaging lens assembly.

When the sixth lens element has negative refractive power, and the sixth lens element and the fifth lens element are cemented together, the refractive power distribution at the image side of the optical imaging lens assembly can be properly adjusted, thereby correcting aberrations of the optical imaging lens assembly effectively and improving the image quality.

When an Abbe number of a lens element is V, and at least three lens elements of the first lens element, the second lens element, the third lens element, the fourth lens element, the fifth lens element, and the sixth lens element in the optical imaging lens assembly satisfy the following condition: V<35, thus light rays in different wavelength ranges can converge more favorably to avoid overlapping images.

According to the optical imaging lens assembly of the present disclosure, the lens elements thereof can be made of glass or plastic. When the lens elements are made of glass, the distribution of the refractive power of the optical imaging lens assembly is more flexible to design. When the lens elements are made of plastic, the manufacturing cost can be effectively reduced. Furthermore, surfaces of each lens element can be arranged to be aspheric (ASP). As aspheric surfaces can be easily formed into shapes other than spherical shapes, more controllable variables can be obtained to eliminate aberrations and to further decrease the required number of lens elements, and consequently, the total track length of the optical imaging lens assembly can be effectively reduced.

According to the optical imaging lens assembly of the present disclosure, the optical imaging lens assembly can include at least one stop, such as an aperture stop, a glare stop or a field stop, so as to favorably reduce the amount of stray light and thereby to improve the image quality.

According to the optical imaging lens assembly of the present disclosure, a stop can be configured as a front stop or a middle stop. A front stop disposed between an imaged object and the first lens element can provide a longer distance between an exit pupil of the optical imaging lens assembly and the image surface, so that the generated telecentric effect can improve the image-sensing efficiency of an image sensor, such as a CCD or CMOS sensor. A middle stop disposed between the first lens element and the image surface is favorable for enlarging the field of view of the optical imaging lens assembly, thereby providing the optical imaging lens assembly with the advantages of a wide-angle lens.

According to the optical imaging lens assembly of the present disclosure, when the lens element has a convex surface and the region of convex shape is not defined, it indicates that the surface can be convex in the paraxial region thereof; when the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the optical imaging lens assembly of the present disclosure, the image surface of the optical imaging lens assembly, based on the corresponding image sensor, can be a plane or a curved surface with any curvature, especially a curved surface being concave facing towards the object side.

The optical imaging lens assembly of the present disclosure can be optionally applied to moving-focus optical systems. The optical imaging lens assembly of the present disclosure features good correction capability and high image quality, and can be applied to electronic devices including, but not limited to, motion-detection imaging devices, head-mounted displays, night vision cameras, car cameras, surveillance cameras, drone cameras, sports and action cameras, multi-lens image capturing devices, digital cameras, mobile devices, smart phones, digital tablets, smart TVs, network surveillance devices, motion sensing input devices, driving recording systems, rear view camera systems, and wearable devices.

The present disclosure further provides an image capturing apparatus comprising the aforementioned optical imaging lens assembly and an image sensor, wherein the image sensor is disposed on or near an image surface of the optical imaging lens assembly. Therefore, the design of the optical imaging lens assembly enables the image capturing apparatus to achieve the best image quality. Preferably, the optical imaging lens assembly can further comprise a barrel member, a holding member or a combination thereof.

Referring to FIG. 11A, FIG. 11B, FIG. 11C and FIG. 11D, an image capturing apparatus 1101 and a display system 1102 may be installed in an electronic device including, but not limited to, a rear view camera 1110, a driving recording system 1120, a surveillance camera 1130, or a smart phone 1140. The four exemplary figures of different electronic devices are only exemplary for showing the image capturing apparatus of the present disclosure installed in an electronic device, and the present disclosure is not limited thereto. Preferably, the electronic device can further comprise a control unit, a display unit, a storage unit, a random access memory unit (RAM) or a combination thereof.

According to the above description of the present disclosure, the following 1st-10th specific embodiments are provided for further explanation.

1st Embodiment

Figure 1B:
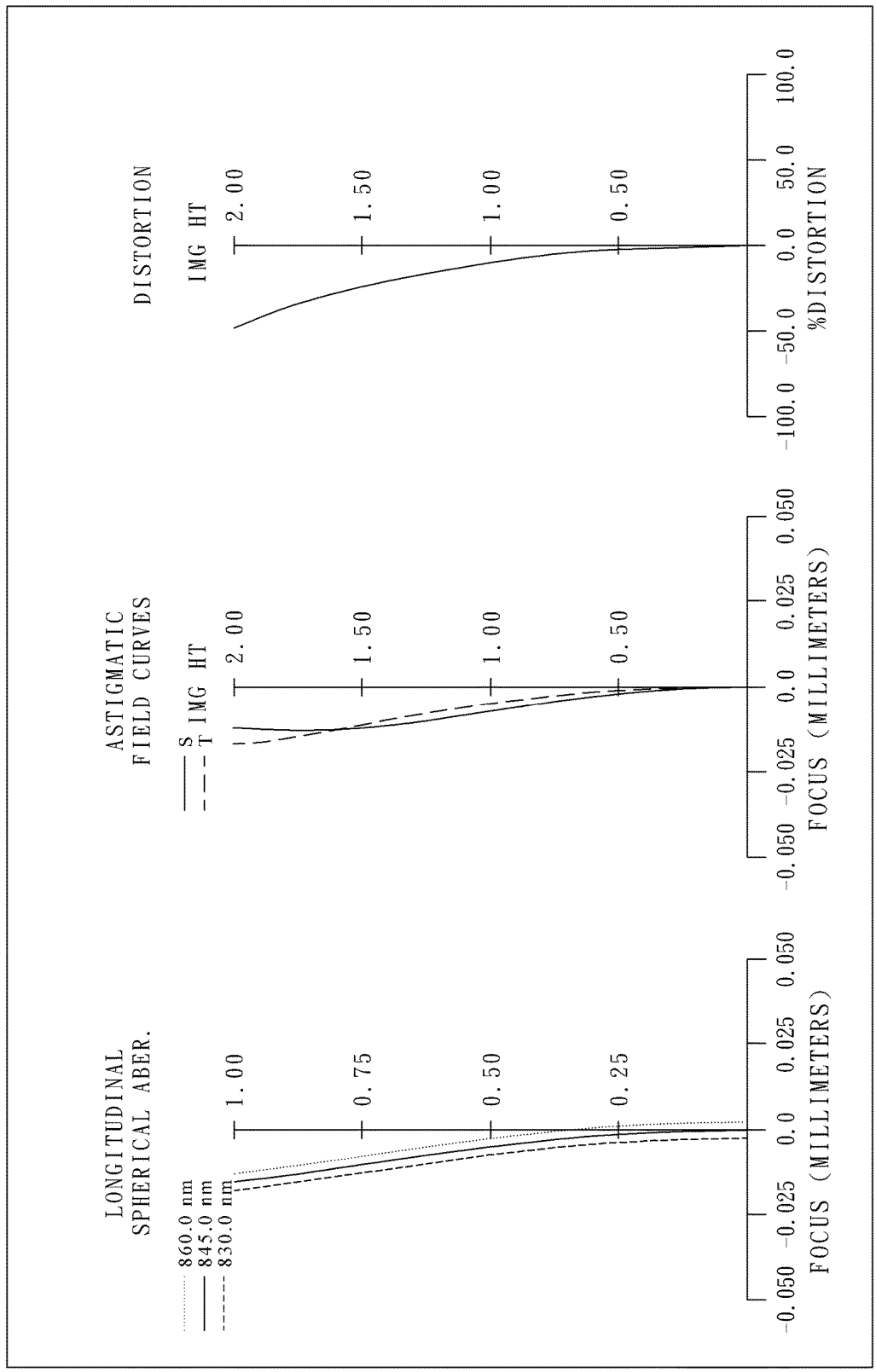
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus comprises an optical imaging lens assembly (not otherwise herein labeled) of the present disclosure and an image sensor 190. The optical imaging lens assembly comprises, in order from an object side to an image side, a first lens element 110, a second lens element 120, a third lens element 130, an aperture stop 100, a fourth lens element 140, a fifth lens element 150, and a sixth lens element 160.

The first lens element 110 with negative refractive power has an object-side surface 111 being convex in a paraxial region thereof and an image-side surface 112 being concave in a paraxial region thereof, and the first lens element 110 is made of glass.

The second lens element 120 with negative refractive power has an object-side surface 121 being convex in a paraxial region thereof and an image-side surface 122 being concave in a paraxial region thereof, and the second lens element 120 is made of glass.

The third lens element 130 with positive refractive power has an object-side surface 131 being convex in a paraxial region thereof and an image-side surface 132 being plane in a paraxial region thereof, and the third lens element 130 is made of glass.

The fourth lens element 140 with positive refractive power has an object-side surface 141 being concave in a paraxial region thereof and an image-side surface 142 being convex in a paraxial region thereof, and the fourth lens element 140 is made of glass.

The fifth lens element 150 with positive refractive power has an object-side surface 151 being convex in a paraxial region thereof and an image-side surface 152 being convex in a paraxial region thereof, and the fifth lens element 150 is made of glass.

The sixth lens element 160 with negative refractive power has an object-side surface 161 being concave in a paraxial region thereof and an image-side surface 162 being convex in a paraxial region thereof, and the sixth lens element 160 is made of glass. Moreover, the sixth lens element 160 and the fifth lens element 150 are cemented together.

The optical imaging lens assembly further comprises a filter 170 located between the sixth lens element 160 and an image surface 180. The filter 170 is made of glass and will not affect the focal length of the optical imaging lens assembly. The image sensor 190 is disposed on or near the image surface 180 of the optical imaging lens assembly.

The detailed optical data of the 1st embodiment are shown in TABLE 1, wherein the units of the curvature radius, the thickness and the focal length are expressed in mm, and HFOV is half of a maximum field of view.

TABLE 1

(1st Embodiment)
f = 2.10 mm, Fno = 2.80, HFOV = 62.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 17.806 | 0.800 | Glass | 1.718 | 54.5 | −3.49 |
| 2 | | 2.158 | 1.850 | | | | |
| 3 | Lens 2 | 3.752 | 1.460 | Glass | 1.657 | 32.3 | −23.89 |
| 4 | | 2.561 | 0.270 | | | | |
| 5 | Lens 3 | 7.617 | 1.130 | Glass | 1.821 | 23.8 | 9.28 |
| 6 | | Plano | 0.150 | | | | |
| 7 | Ape. Stop | Plano | 0.570 | | | | |
| 8 | Lens 4 | −33.649 | 2.490 | Glass | 1.790 | 46.5 | 5.33 |
| 9 | | −3.867 | 0.100 | | | | |
| 10 | Lens 5 | 5.235 | 2.330 | Glass | 1.668 | 55.2 | 3.57 |
| 11 | | −3.590 | 0.010 | Cement | 1.503 | 38.8 | |
| 12 | Lens 6 | −3.585 | 0.600 | Glass | 1.821 | 23.8 | −5.19 |
| 13 | | −24.476 | 0.800 | | | | |
| 14 | Filter | Plano | 0.300 | Glass | 1.517 | 64.2 | — |
| 15 | | Plano | 2.139 | | | | |
| 16 | Image Surface | Plano | — | | | | |

Note:
Reference wavelength is 845.0 nm.

The equation of the aspheric surface profiles is expressed as follows:

$$X(Y) = (Y^2/R)/(1+sqrt(1-(1+k)*(Y/R)^2)) + \sum_i (Ai)*(Y^i)$$

where:
X is the relative distance between a point on the aspheric surface spaced at a distance Y from the optical axis and the tangential plane at the aspheric surface vertex on the optical axis;
Y is the vertical distance from the point on the aspheric surface profile to the optical axis;
R is the curvature radius;
k is the conic coefficient; and
Ai is the i-th aspheric coefficient.

In the 1st embodiment, a focal length of the optical imaging lens assembly is f, an f-number of the optical imaging lens assembly is Fno, half of a maximum field of view of the optical imaging lens assembly is HFOV, and these parameters have the following values: f=2.10 mm; Fno=2.80; and HFOV=62.7 degrees.

In the 1st embodiment, half of the maximum field of view of the optical imaging lens assembly is HFOV, and it satisfies the condition: |1/tan(HFOV)|=0.52.

In the 1st embodiment, the reference wavelength of the optical imaging lens assembly is 845.0 nm.

In the 1st embodiment, an Abbe number of the second lens element 120 is V2, an Abbe number of the third lens element 130 is V3, and they satisfy the condition: (V2+V3)/2=28.05.

In the 1st embodiment, a central thickness of the second lens element 120 is CT2, a central thickness of the third lens element 130 is CT3, and they satisfy the condition: CT3/CT2=0.77.

In the 1st embodiment, a central thickness of the fourth lens element 140 is CT4, an axial distance between the second lens element 120 and the third lens element 130 is T23, and they satisfy the condition: CT4/T23=9.22.

In the 1st embodiment, the axial distance between the second lens element 120 and the third lens element 130 is T23, an axial distance between the fourth lens element 140 and the fifth lens element 150 is T45, and they satisfy the condition: T23/T45=2.70.

In the 1st embodiment, a sum of the central thicknesses of the first lens element 110, the second lens element 120, the third lens element 130, the fourth lens element 140, the fifth lens element 150, and the sixth lens element 160 is ΣCT, a sum of axial distances between respective two adjacent lens elements of the optical imaging lens assembly is ΣAT, and they satisfy the condition: ΣCT/ΣAT=2.99.

In the 1st embodiment, an axial distance between the image-side surface 162 of the sixth lens element 160 and the image surface 180 is BL, the sum of axial distances between respective two adjacent lens elements of the optical imaging lens assembly is ΣAT, and they satisfy the condition: BL/ΣAT=1.10.

In the 1st embodiment, an axial distance between the aperture stop 100 and the image-side surface 162 of the sixth lens element 160 is SD, an axial distance between the object-side surface 111 of the first lens element 110 and the image-side surface 162 of the sixth lens element 160 is TD, and they satisfy the condition: SD/TD=0.52.

In the 1st embodiment, a curvature radius of the object-side surface 161 of the sixth lens element 160 is R11, a curvature radius of the image-side surface 162 of the sixth lens element 160 is R12, and they satisfy the condition: R11/R12=0.15.

In the 1st embodiment, a curvature radius of the image-side surface 122 of the second lens element 120 is R4, a curvature radius of the object-side surface 131 of the third lens element 130 is R5, and they satisfy the condition: |R4/R5|=0.34.

In the 1st embodiment, a curvature radius of the object-side surface 111 of the first lens element 110 is R1, a curvature radius of the image-side surface 112 of the first lens element 110 is R2, and they satisfy the condition: (R1+R2)/(R1−R2)=1.28.

In the 1st embodiment, a curvature radius of the object-side surface 141 of the fourth lens element 140 is R7, a curvature radius of the image-side surface 142 of the fourth lens element 140 is R8, and they satisfy the condition: (R7+R8)/(R7−R8)=1.26.

In the 1st embodiment, the curvature radius of the object-side surface 111 of the first lens element 110 is R1, the curvature radius of the image-side surface 162 of the sixth lens element 160 is R12, and they satisfy the condition: (R1+R12)/(R1−R12)=−0.16.

In the 1st embodiment, a curvature radius of the object-side surface 151 of the fifth lens element 150 is R9, the curvature radius of the image-side surface 162 of the sixth lens element 160 is R12, and they satisfy the condition: (R9+R12)/(R9−R12)=−0.65.

In the 1st embodiment, a focal length of the second lens element 120 is f2, a focal length of the fifth lens element 150 is f5, and they satisfy the condition: |f2/f5|=6.70.

In the 1st embodiment, the focal length of the optical imaging lens assembly is f, an axial distance between the first lens element 110 and the second lens element 120 is T12, and they satisfy the condition: f/T12=1.14.

In the 1st embodiment, the focal length of the optical imaging lens assembly is f, an entrance pupil diameter of the optical imaging lens assembly is EPD, and they satisfy the condition: f/EPD=2.80.

2nd Embodiment

Figure 2A:
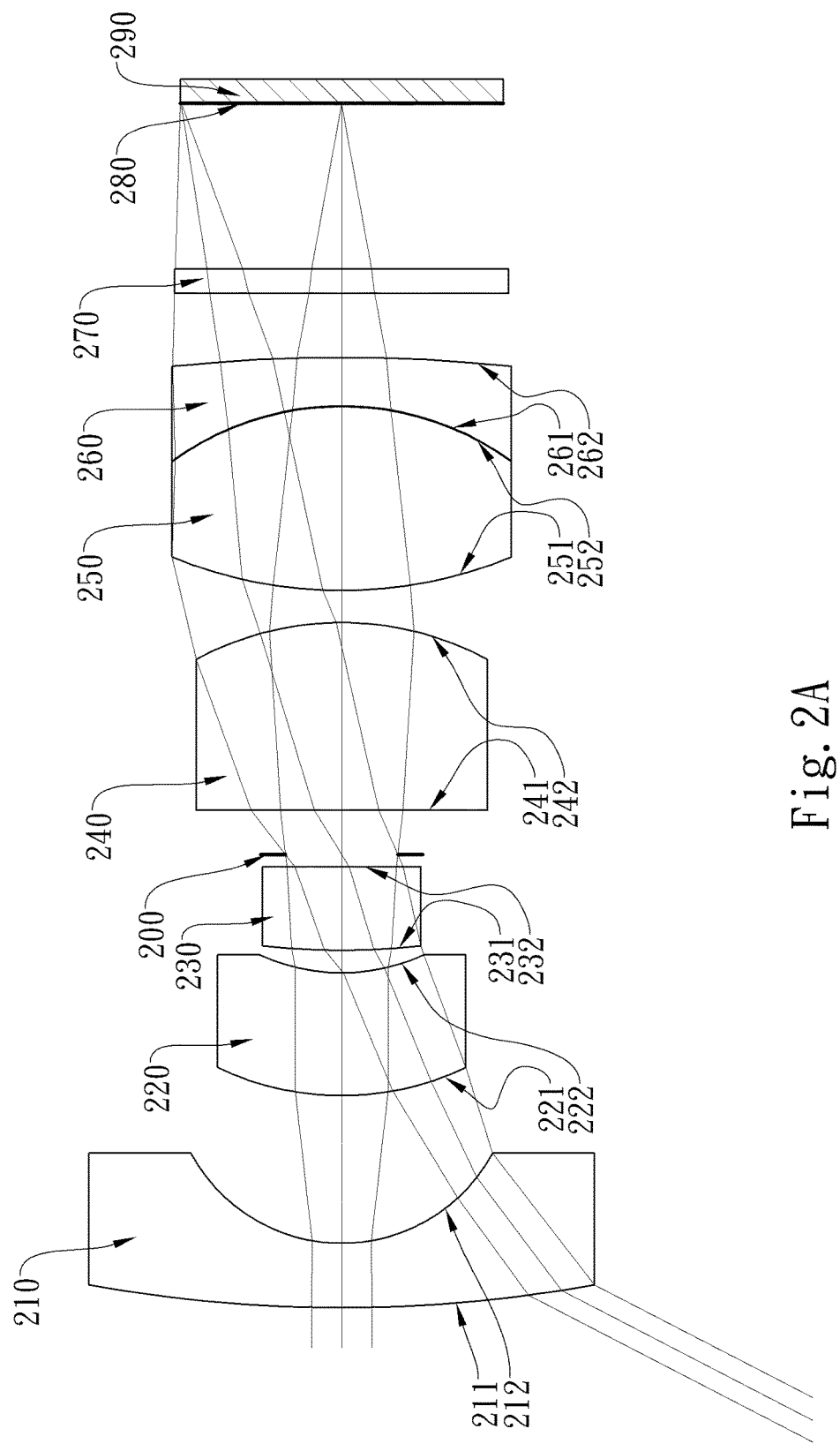
FIG. 2A is a schematic view of an image capturing apparatus according to the 2nd embodiment of the present disclosure.
Figure 2B:
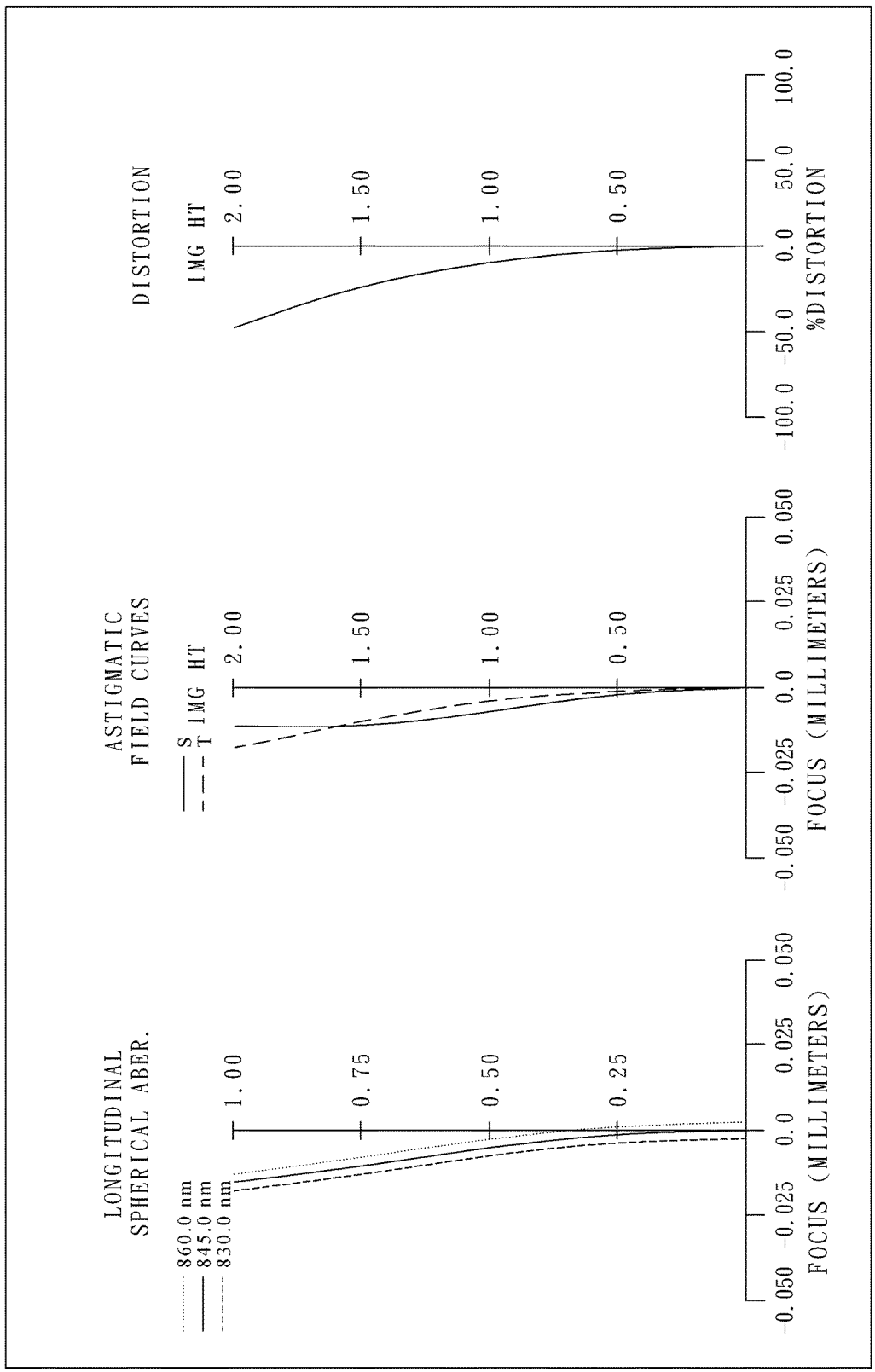
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, the image capturing apparatus comprises an optical imaging lens assembly (not otherwise herein labeled) of the present disclosure and an image sensor 290. The optical imaging lens assembly comprises, in order from an object side to an image side, a first lens element 210, a second lens element 220, a third lens element 230, an aperture stop 200, a fourth lens element 240, a fifth lens element 250, and a sixth lens element 260.

The first lens element 210 with negative refractive power has an object-side surface 211 being convex in a paraxial region thereof and an image-side surface 212 being concave in a paraxial region thereof, and the first lens element 210 is made of glass.

The second lens element 220 with negative refractive power has an object-side surface 221 being convex in a paraxial region thereof and an image-side surface 222 being concave in a paraxial region thereof, and the second lens element 220 is made of glass.

The third lens element 230 with positive refractive power has an object-side surface 231 being convex in a paraxial region thereof and an image-side surface 232 being plane in a paraxial region thereof, and the third lens element 230 is made of glass.

The fourth lens element 240 with positive refractive power has an object-side surface 241 being plane in a paraxial region thereof and an image-side surface 242 being convex in a paraxial region thereof, and the fourth lens element 240 is made of glass.

The fifth lens element 250 with positive refractive power has an object-side surface 251 being convex in a paraxial region thereof and an image-side surface 252 being convex in a paraxial region thereof, and the fifth lens element 250 is made of glass.

The sixth lens element 260 with negative refractive power has an object-side surface 261 being concave in a paraxial region thereof and an image-side surface 262 being convex in a paraxial region thereof, and the sixth lens element 260 is made of glass.

The optical imaging lens assembly further comprises a filter 270 located between the sixth lens element 260 and an image surface 280. The filter 270 is made of glass and will not affect the focal length of the optical imaging lens assembly. The image sensor 290 is disposed on or near the image surface 280 of the optical imaging lens assembly.

The detailed optical data of the 2nd embodiment are shown in TABLE 2, wherein the units of the curvature radius, the thickness and the focal length are expressed in mm, and HFOV is half of a maximum field of view.

TABLE 2

(2nd Embodiment)
f = 2.11 mm, Fno = 2.80, HFOV = 62.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 17.618 | 0.800 | Glass | 1.718 | 54.5 | −3.45 |
| 2 | | 2.130 | 1.840 | | | | |
| 3 | Lens 2 | 3.606 | 1.530 | Glass | 1.657 | 32.3 | −25.09 |
| 4 | | 2.461 | 0.280 | | | | |
| 5 | Lens 3 | 9.120 | 1.040 | Glass | 1.821 | 23.8 | 11.11 |
| 6 | | Plano | 0.150 | | | | |
| 7 | Ape. Stop | Plano | 0.550 | | | | |
| 8 | Lens 4 | Plano | 2.340 | Glass | 1.790 | 46.5 | 4.83 |
| 9 | | −3.817 | 0.400 | | | | |
| 10 | Lens 5 | 5.577 | 2.290 | Glass | 1.668 | 55.2 | 3.63 |
| 11 | | −3.590 | 0.010 | Cement | 1.503 | 38.8 | |
| 12 | Lens 6 | −3.585 | 0.600 | Glass | 1.821 | 23.8 | −5.38 |
| 13 | | −20.509 | 0.800 | | | | |
| 14 | Filter | Plano | 0.300 | Glass | 1.517 | 64.2 | — |
| 15 | | Plano | 2.067 | | | | |
| 16 | Image Surface | Plano | — | | | | |

Note:
Reference wavelength is 845.0 nm.

In the 2nd embodiment, the equation of the aspheric surface profiles of the aforementioned lens elements is the same as the equation from the 1st embodiment. Also, the definitions of the parameters shown in TABLE 3 below are the same as those stated in the 1st embodiment, but the values for the conditions in the 2nd embodiment are as specified below; an explanation in this regard will not be provided again.

TABLE 3

| 2nd Embodiment | | | |
|---|---|---|---|
| f [mm] | 2.11 | SD/TD | 0.52 |
| Fno. | 2.80 | R11/R12 | 0.17 |
| HFOV [deg.] | 62.6 | |R4/R5| | 0.27 |
| λ [nm] | 845.0 | (R1 + R2)/(R1 − R2) | 1.28 |
| |1/tan(HFOV)| | 0.52 | (R7 + R8)/(R7 − R8) | 1.00 |
| (V2 + V3)/2 | 28.05 | (R1 + R12)/(R1 − R12) | −0.08 |
| CT3/CT2 | 0.68 | (R9 + R12)/(R9 − R12) | −0.57 |
| CT4/T23 | 8.36 | |f2/f5| | 6.91 |
| T23/T45 | 0.70 | f/T12 | 1.14 |
| ΣCT/ΣAT | 2.66 | f/EPD | 2.80 |
| BL/ΣAT | 0.98 | | |

3rd Embodiment

Figure 3A:
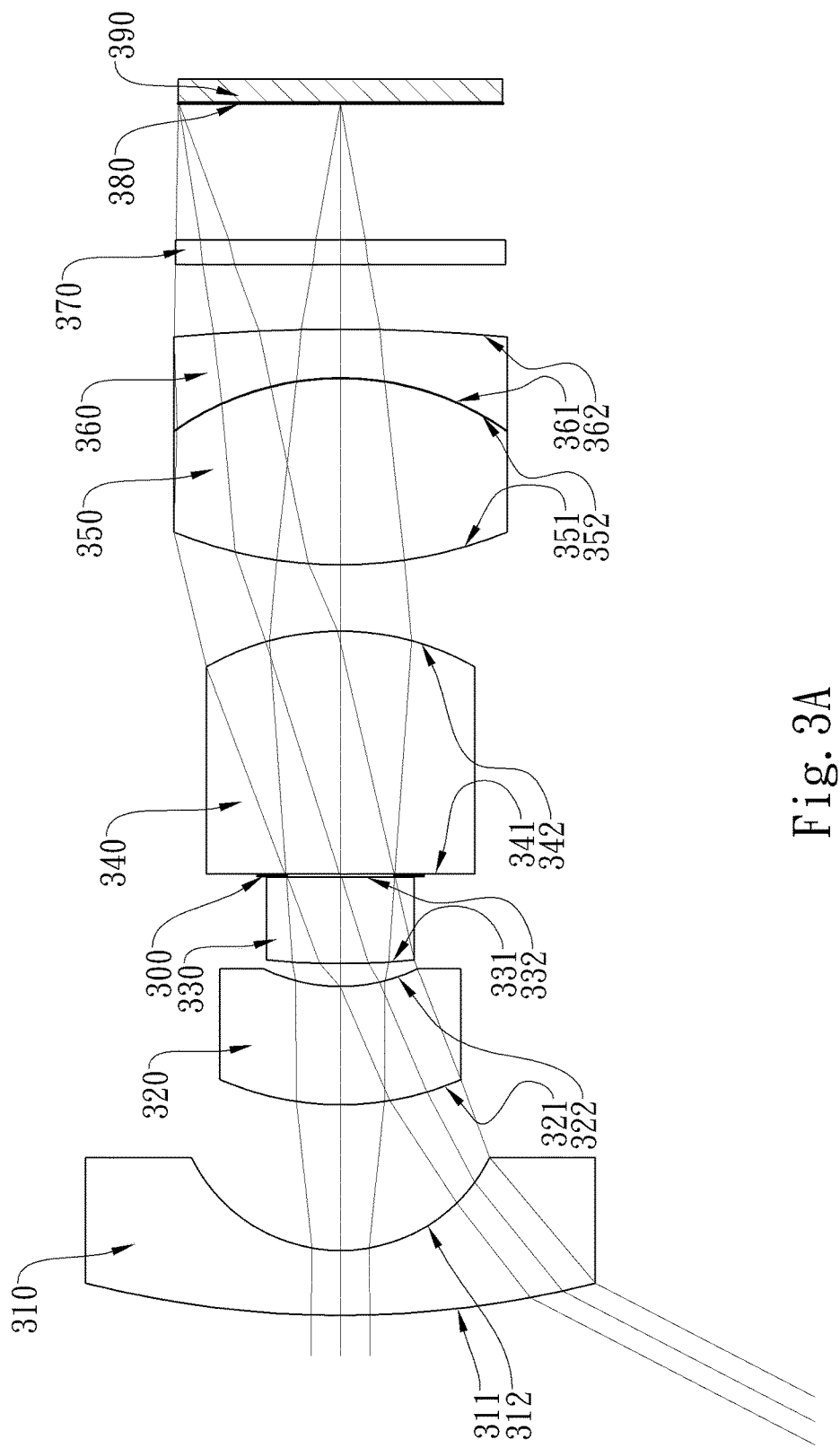
FIG. 3A is a schematic view of an image capturing apparatus according to the 3rd embodiment of the present disclosure.
Figure 3B:
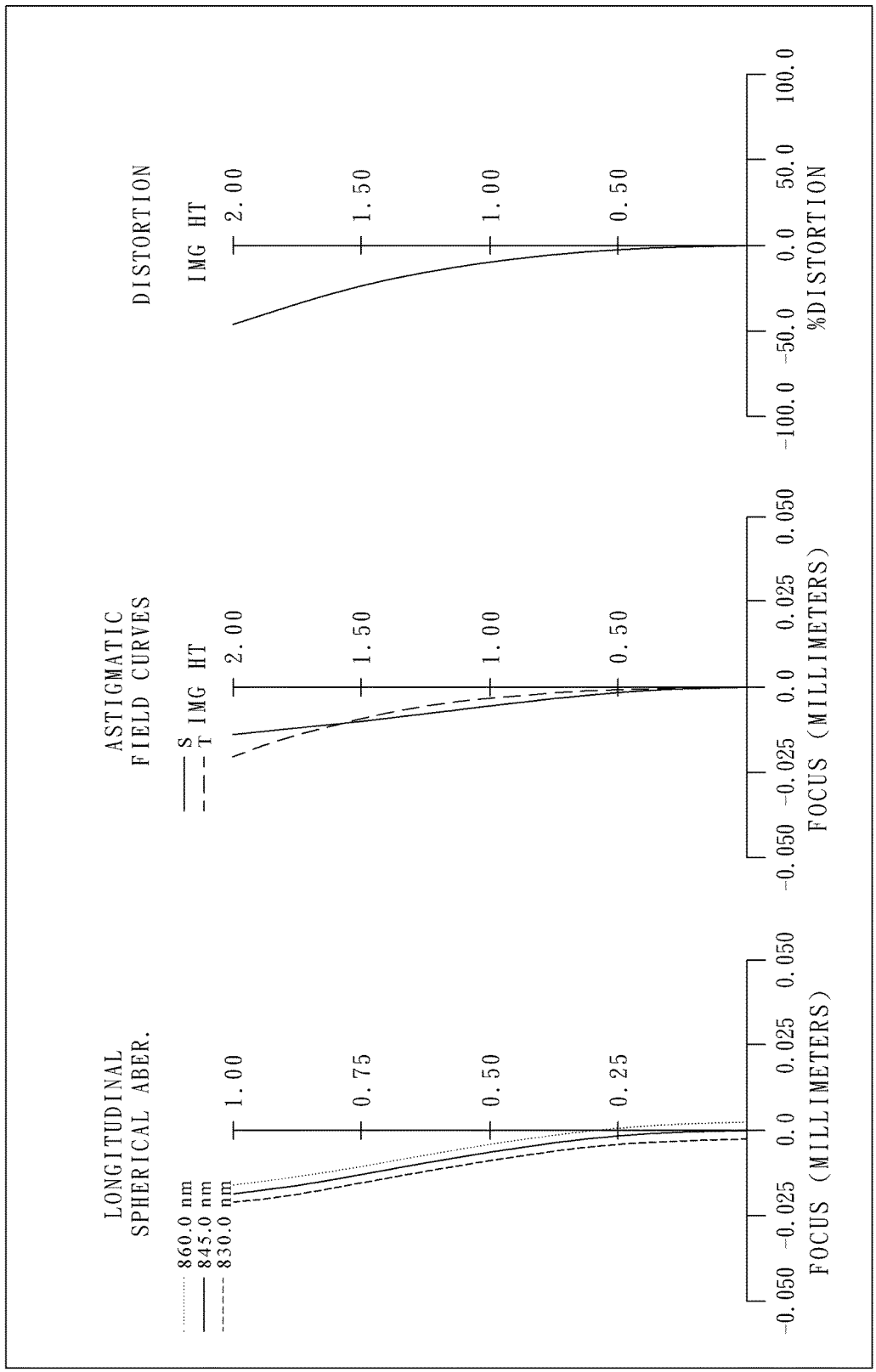
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, the image capturing apparatus comprises an optical imaging lens assembly (not otherwise herein labeled) of the present disclosure and an image sensor 390. The optical imaging lens assembly comprises, in order from an object side to an image side, a first lens element 310, a second lens element 320, a third lens element 330, an aperture stop 300, a fourth lens element 340, a fifth lens element 350, and a sixth lens element 360.

The first lens element 310 with negative refractive power has an object-side surface 311 being convex in a paraxial region thereof and an image-side surface 312 being concave in a paraxial region thereof, and the first lens element 310 is made of glass.

The second lens element 320 with negative refractive power has an object-side surface 321 being convex in a paraxial region thereof and an image-side surface 322 being concave in a paraxial region thereof, and the second lens element 320 is made of glass.

The third lens element 330 with positive refractive power has an object-side surface 331 being convex in a paraxial region thereof and an image-side surface 332 being plane in a paraxial region thereof, and the third lens element 330 is made of glass.

The fourth lens element 340 with positive refractive power has an object-side surface 341 being plane in a paraxial region thereof and an image-side surface 342 being convex in a paraxial region thereof, and the fourth lens element 340 is made of glass.

The fifth lens element 350 with positive refractive power has an object-side surface 351 being convex in a paraxial region thereof and an image-side surface 352 being convex in a paraxial region thereof, and the fifth lens element 350 is made of glass.

The sixth lens element 360 with negative refractive power has an object-side surface 361 being concave in a paraxial region thereof and an image-side surface 362 being convex in a paraxial region thereof, and the sixth lens element 360 is made of glass.

The optical imaging lens assembly further comprises a filter 370 located between the sixth lens element 360 and an image surface 380. The filter 370 is made of glass and will not affect the focal length of the optical imaging lens assembly. The image sensor 390 is disposed on or near the image surface 380 of the optical imaging lens assembly.

The detailed optical data of the 3rd embodiment are shown in TABLE 4, wherein the units of the curvature radius, the thickness and the focal length are expressed in mm, and HFOV is half of a maximum field of view.

TABLE 4

(3rd Embodiment)
f = 2.03 mm, Fno = 2.80, HFOV = 62.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 12.718 | 0.800 | Glass | 1.718 | 54.5 | −3.52 |
| 2 | | 2.052 | 1.800 | | | | |
| 3 | Lens 2 | 3.709 | 1.460 | Glass | 1.657 | 32.3 | −12.81 |
| 4 | | 2.172 | 0.280 | | | | |
| 5 | Lens 3 | 8.726 | 1.070 | Glass | 1.821 | 23.8 | 10.63 |
| 6 | | Plano | 0.020 | | | | |
| 7 | Ape. Stop | Plano | 0.020 | | | | |
| 8 | Lens 4 | Plano | 3.000 | Glass | 1.790 | 46.5 | 4.23 |
| 9 | | −3.341 | 0.820 | | | | |
| 10 | Lens 5 | 5.458 | 2.300 | Glass | 1.668 | 55.2 | 3.59 |
| 11 | | −3.561 | 0.010 | Cement | 1.503 | 38.8 | |
| 12 | Lens 6 | −3.558 | 0.600 | Glass | 1.821 | 23.8 | −5.23 |
| 13 | | −22.327 | 0.800 | | | | |
| 14 | Filter | Plano | 0.300 | Glass | 1.517 | 64.2 | — |
| 15 | | Plano | 1.688 | | | | |
| 16 | Image Surface | Plano | — | | | | |

Note:
Reference wavelength is 845.0 nm.

In the 3rd embodiment, the equation of the aspheric surface profiles of the aforementioned lens elements is the same as the equation from the 1st embodiment. Also, the definitions of the parameters shown in TABLE 5 below are the same as those stated in the 1st embodiment, but the values for the conditions in the 3rd embodiment are as specified below; an explanation in this regard will not be provided again.

TABLE 5

3rd Embodiment

| f [mm] | 2.03 | SD/TD | 0.55 |
|---|---|---|---|
| Fno. | 2.80 | R11/R12 | 0.16 |
| HFOV [deg.] | 62.6 | |R4/R5| | 0.25 |
| λ [nm] | 845.0 | (R1 + R2)/(R1 − R2) | 1.38 |
| |1/tan(HFOV)| | 0.52 | (R7 + R8)/(R7 − R8) | 1.00 |
| (V2 + V3)/2 | 28.05 | (R1 + R12)/(R1 − R12) | −0.27 |
| CT3/CT2 | 0.73 | (R9 + R12)/(R9 − R12) | −0.61 |
| CT4/T23 | 10.71 | |f2/f5| | 3.56 |
| T23/T45 | 0.34 | f/T12 | 1.13 |
| ΣCT/ΣAT | 3.13 | f/EPD | 2.80 |
| BL/ΣAT | 0.95 | | |

4th Embodiment

Figure 4A:
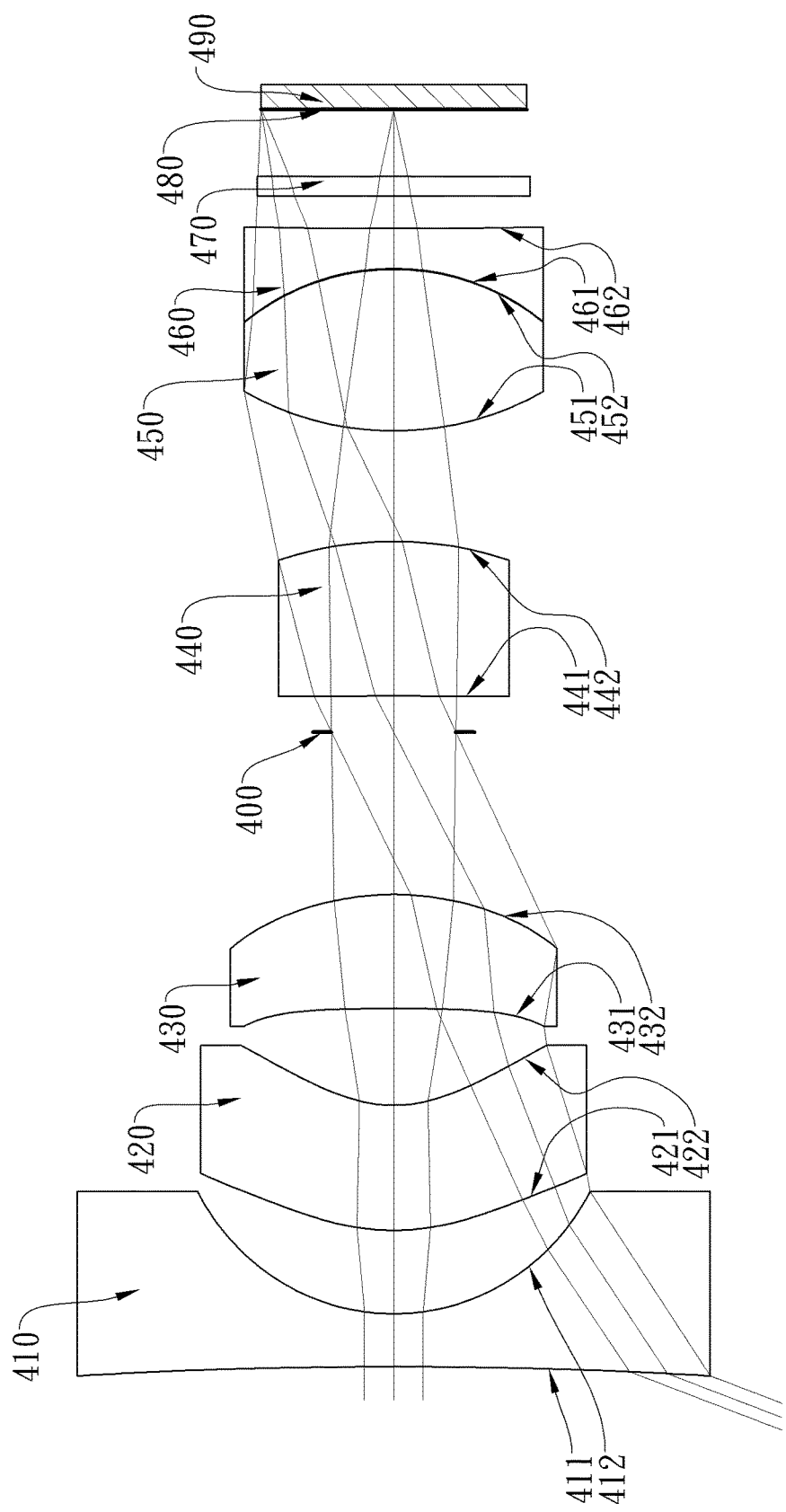
FIG. 4A is a schematic view of an image capturing apparatus according to the 4th embodiment of the present disclosure.
Figure 4B:
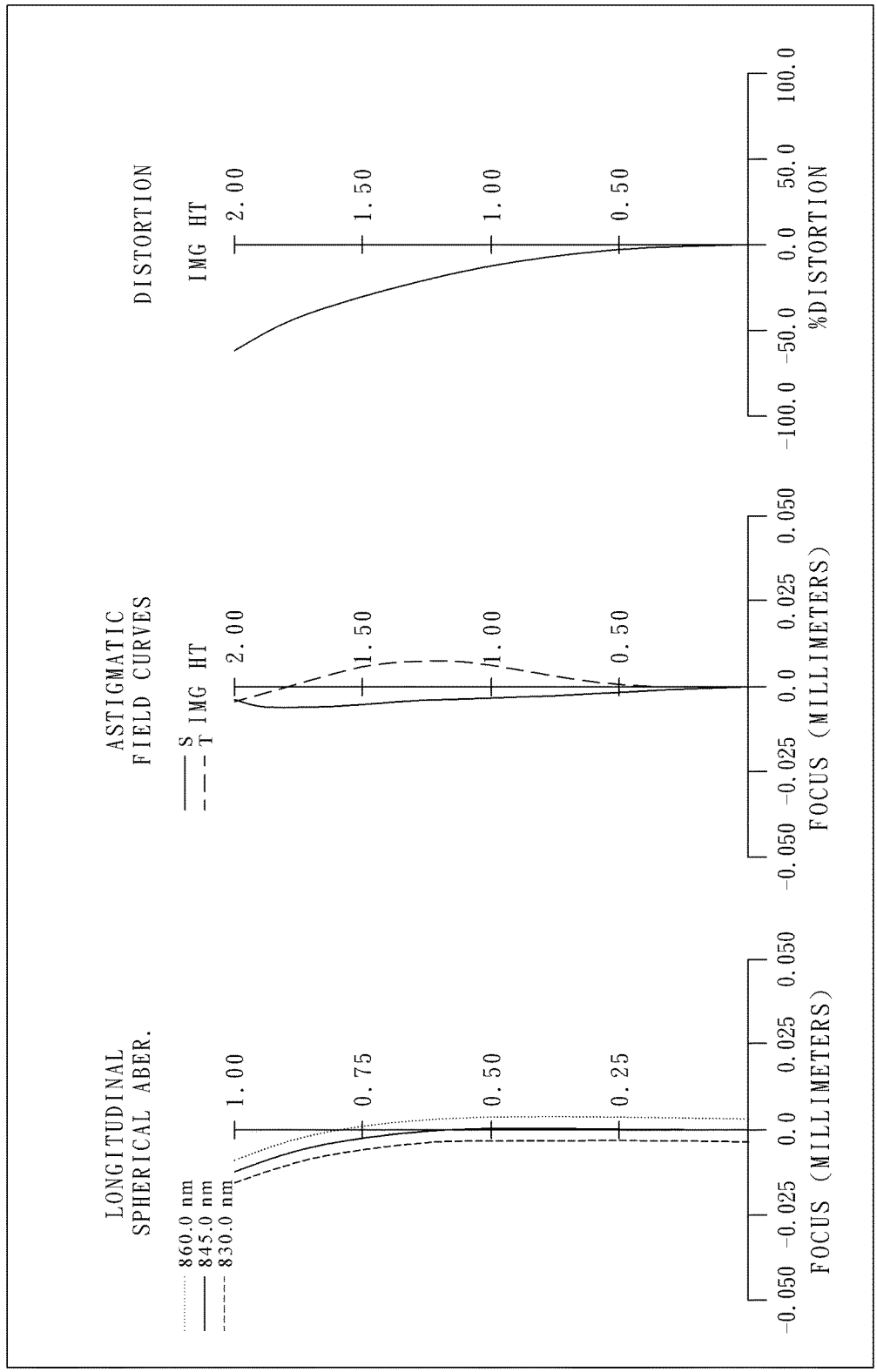
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, the image capturing apparatus comprises an optical imaging lens assembly (not otherwise herein labeled) of the present disclosure and an image sensor 490. The optical imaging lens assembly comprises, in order from an object side to an image side, a first lens element 410, a second lens element 420, a third lens element 430, an aperture stop 400, a fourth lens element 440, a fifth lens element 450, and a sixth lens element 460.

The first lens element 410 with negative refractive power has an object-side surface 411 being concave in a paraxial region thereof and an image-side surface 412 being concave in a paraxial region thereof, and the first lens element 410 is made of glass.

The second lens element 420 with negative refractive power has an object-side surface 421 being convex in a paraxial region thereof and an image-side surface 422 being concave in a paraxial region thereof, and the second lens element 420 is made of glass.

The third lens element 430 with positive refractive power has an object-side surface 431 being concave in a paraxial region thereof and an image-side surface 432 being convex in a paraxial region thereof, and the third lens element 430 is made of glass.

The fourth lens element 440 with positive refractive power has an object-side surface 441 being concave in a paraxial region thereof and an image-side surface 442 being convex in a paraxial region thereof, and the fourth lens element 440 is made of glass.

The fifth lens element 450 with positive refractive power has an object-side surface 451 being convex in a paraxial region thereof and an image-side surface 452 being convex in a paraxial region thereof, and the fifth lens element 450 is made of glass.

The sixth lens element 460 with negative refractive power has an object-side surface 461 being concave in a paraxial region thereof and an image-side surface 462 being concave in a paraxial region thereof, and the sixth lens element 460 is made of glass.

The optical imaging lens assembly further comprises a filter 470 located between the sixth lens element 460 and an image surface 480. The filter 470 is made of glass and will not affect the focal length of the optical imaging lens assembly. The image sensor 490 is disposed on or near the image surface 480 of the optical imaging lens assembly.

The detailed optical data of the 4th embodiment are shown in TABLE 6, and the aspheric surface data are shown in TABLE 7, wherein the units of the curvature radius, the thickness and the focal length are expressed in mm, and HFOV is half of a maximum field of view.

TABLE 6

(4th Embodiment)
f = 2.13 mm, Fno = 2.40, HFOV = 69.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −83.333 | ASP | 0.800 | Glass | 1.604 | 58.6 | −5.13 |
| 2 | | 3.233 | ASP | 1.261 | | | | |
| 3 | Lens 2 | 3.422 | ASP | 1.893 | Glass | 1.780 | 45.4 | −16.38 |
| 4 | | 2.045 | ASP | 1.462 | | | | |
| 5 | Lens 3 | −35.714 | ASP | 1.721 | Glass | 1.782 | 25.5 | 6.23 |
| 6 | | −4.378 | ASP | 2.457 | | | | |
| 7 | Ape. Stop | Plano | | 0.550 | | | | |
| 8 | Lens 4 | −66.632 | | 2.334 | Glass | 1.790 | 46.5 | 7.37 |
| 9 | | −5.440 | | 1.667 | | | | |
| 10 | Lens 5 | 4.581 | | 2.446 | Glass | 1.668 | 55.2 | 3.42 |
| 11 | | −3.571 | | 0.010 | Cement | 1.503 | 38.8 | |
| 12 | Lens 6 | −3.571 | | 0.600 | Glass | 1.821 | 23.8 | −4.17 |
| 13 | | 90.069 | | 0.494 | | | | |
| 14 | Filter | Plano | | 0.300 | Glass | 1.517 | 64.2 | — |
| 15 | | Plano | | 1.007 | | | | |
| 16 | Image Surface | Plano | | — | | | | |

Note:
Reference wavelength is 845.0 nm.

TABLE 7

Aspheric Coefficients

| | Surface # | | |
|---|---|---|---|
| | 1 | 2 | 3 |
| k = | 2.2945E+00 | −7.4451E−02 | −1.4653E+00 |
| A4 = | 3.6224E−07 | 2.4670E−06 | −4.0059E−03 |
| A6 = | −5.9814E−10 | −9.2128E−09 | −3.5685E−04 |
| A8 = | 2.4004E−13 | 8.1915E−12 | 4.2211E−05 |

| | Surface # | | |
|---|---|---|---|
| | 4 | 5 | 6 |
| k = | −1.6736E+00 | 8.9112E+01 | −2.9032E−01 |
| A4 = | −8.4590E−03 | −4.0722E−03 | 2.5139E−04 |
| A6 = | 2.3266E−05 | −1.3466E−04 | −3.1138E−04 |
| A8 = | 4.7966E−05 | −9.5696E−05 | −9.6488E−06 |

In the 4th embodiment, the equation of the aspheric surface profiles of the aforementioned lens elements is the same as the equation from the 1st embodiment. Also, the definitions of the parameters shown in TABLE 8 below are the same as those stated in the 1st embodiment, but the values for the conditions in the 4th embodiment are as specified below; an explanation in this regard will not be provided again.

TABLE 8

4th Embodiment

| f [mm] | 2.13 | SD/TD | 0.44 |
|---|---|---|---|
| Fno. | 2.40 | R11/R12 | −0.04 |
| HFOV [deg.] | 69.0 | |R4/R5| | 0.06 |
| λ [nm] | 845.0 | (R1 + R2)/(R1 − R2) | 0.93 |
| |1/tan(HFOV)| | 0.38 | (R7 + R8)/(R7 − R8) | 1.18 |
| (V2 + V3)/2 | 35.45 | (R1 + R12)/(R1 − R12) | −0.04 |
| CT3/CT2 | 0.91 | (R9 + R12)/(R9 − R12) | −1.11 |
| CT4/T23 | 1.60 | |f2/f5| | 4.80 |
| T23/T45 | 0.88 | f/T12 | 1.69 |
| ΣCT/ΣAT | 1.32 | f/EPD | 2.40 |
| BL/ΣAT | 0.24 | | |

5th Embodiment

Figure 5A:
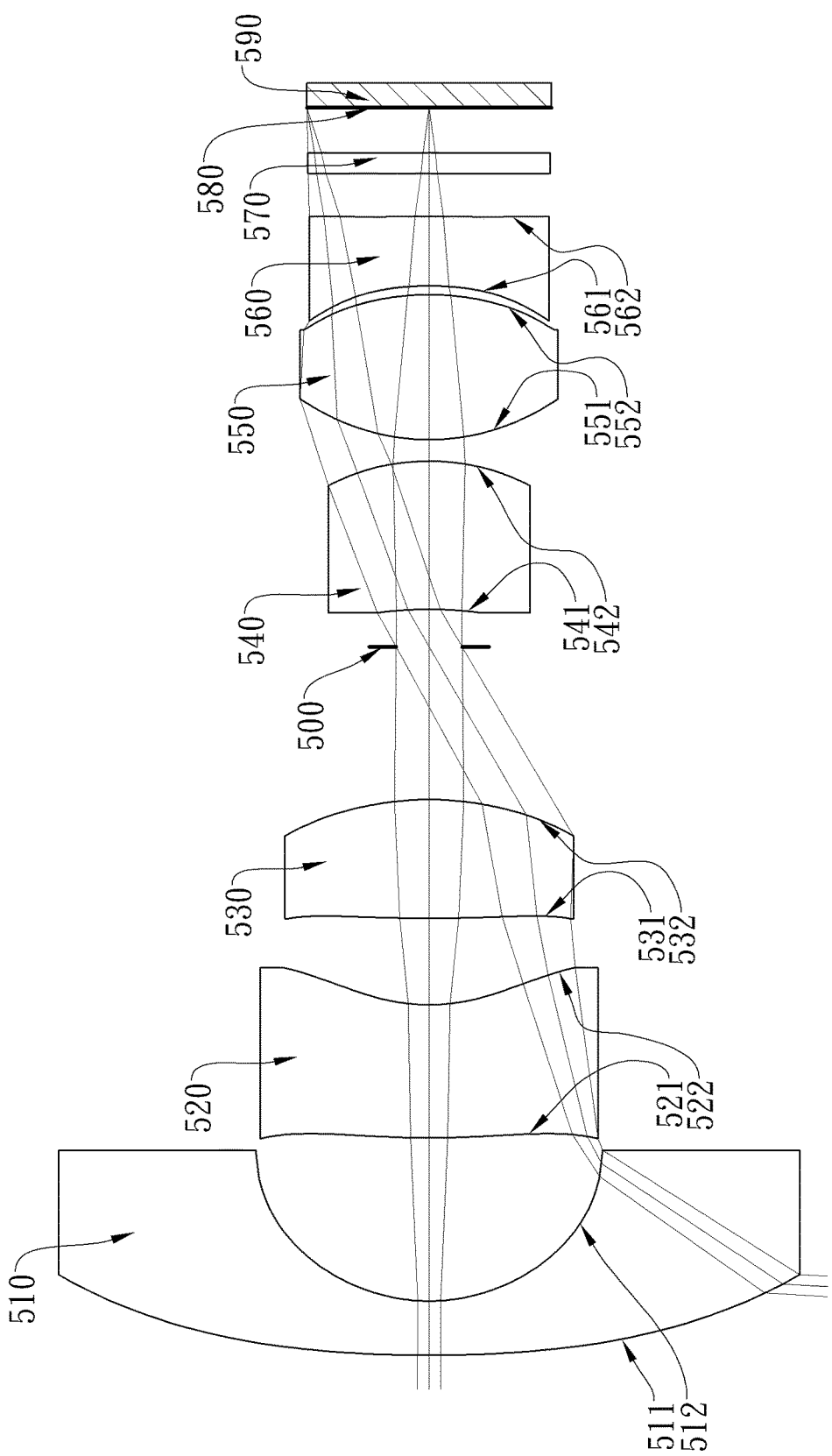
FIG. 5A is a schematic view of an image capturing apparatus according to the 5th embodiment of the present disclosure.
Figure 5B:
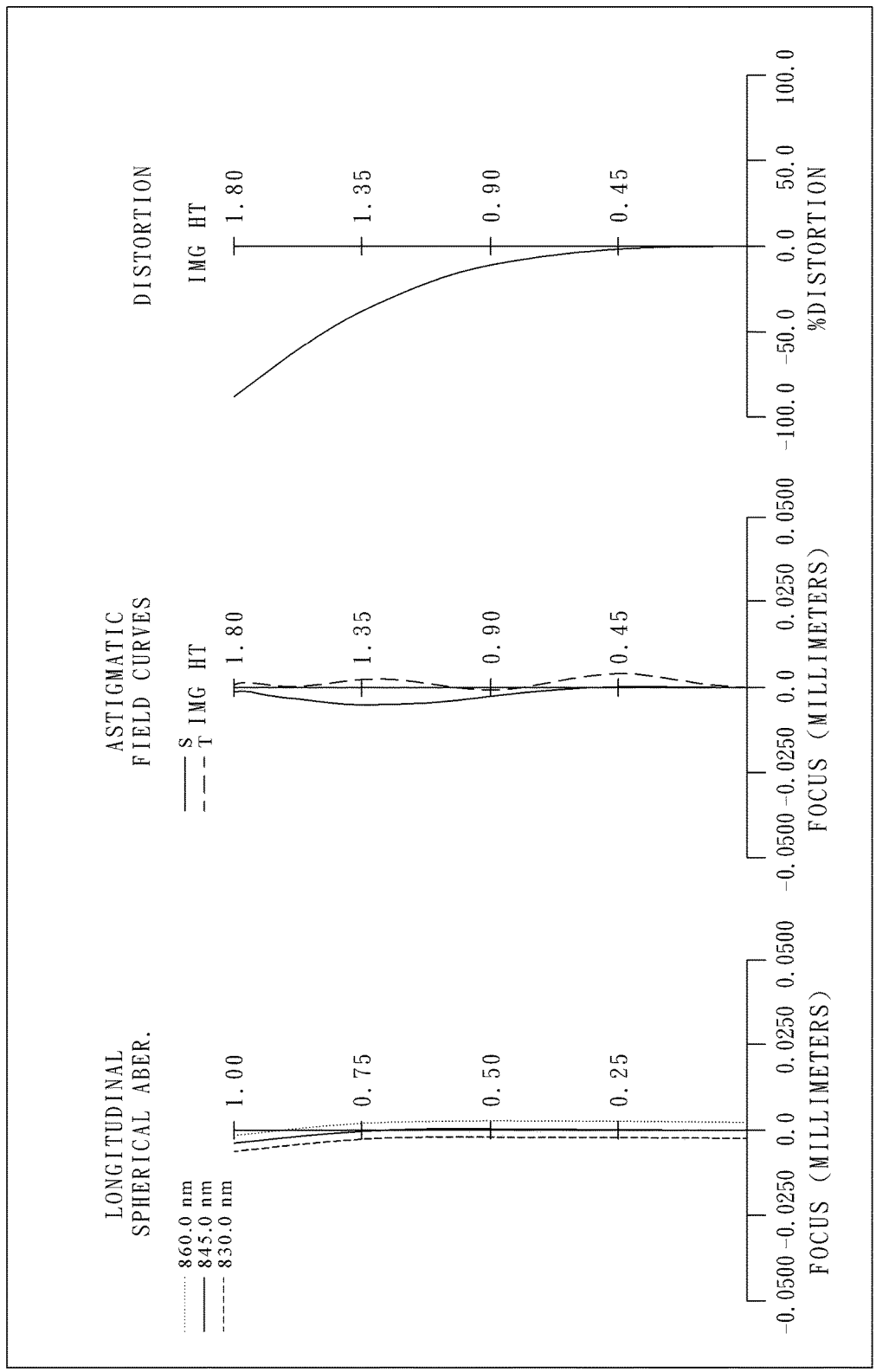
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, the image capturing apparatus comprises an optical imaging lens assembly (not otherwise herein labeled) of the present disclosure and an image sensor 590. The optical imaging lens assembly comprises, in order from an object side to an image side, a first lens element 510, a second lens element 520, a third lens element 530, an aperture stop 500, a fourth lens element 540, a fifth lens element 550, and a sixth lens element 560.

The first lens element 510 with negative refractive power has an object-side surface 511 being convex in a paraxial region thereof and an image-side surface 512 being concave in a paraxial region thereof, and the first lens element 510 is made of glass.

The second lens element 520 with negative refractive power has an object-side surface 521 being convex in a paraxial region thereof and an image-side surface 522 being concave in a paraxial region thereof, and the second lens element 520 is made of plastic.

The third lens element 530 with positive refractive power has an object-side surface 531 being convex in a paraxial region thereof and an image-side surface 532 being convex in a paraxial region thereof, and the third lens element 530 is made of glass.

The fourth lens element 540 with positive refractive power has an object-side surface 541 being concave in a paraxial region thereof and an image-side surface 542 being convex in a paraxial region thereof, and the fourth lens element 540 is made of plastic.

The fifth lens element 550 with positive refractive power has an object-side surface 551 being convex in a paraxial region thereof and an image-side surface 552 being convex in a paraxial region thereof, and the fifth lens element 550 is made of plastic.

The sixth lens element 560 with negative refractive power has an object-side surface 561 being concave in a paraxial region thereof and an image-side surface 562 being convex in a paraxial region thereof, and the sixth lens element 560 is made of plastic.

The optical imaging lens assembly further comprises a filter 570 located between the sixth lens element 560 and an image surface 580. The filter 570 is made of glass and will not affect the focal length of the optical imaging lens assembly. The image sensor 590 is disposed on or near the image surface 580 of the optical imaging lens assembly.

The detailed optical data of the 5th embodiment are shown in TABLE 9, and the aspheric surface data are shown in TABLE 10, wherein the units of the curvature radius, the thickness and the focal length are expressed in mm, and HFOV is half of a maximum field of view.

TABLE 9

(5th Embodiment)
f = 1.24 mm, Fno = 3.60, HFOV = 86.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 19.174 | ASP | 0.800 | Glass | 1.791 | 40.7 | −4.07 |
| 2 | | 2.703 | ASP | 2.400 | | | | |
| 3 | Lens 2 | 11.722 | ASP | 1.957 | Plastic | 1.569 | 30.2 | −6.28 |
| 4 | | 2.572 | ASP | 1.274 | | | | |
| 5 | Lens 3 | 21.297 | ASP | 1.747 | Glass | 1.821 | 23.8 | 4.72 |
| 6 | | −4.565 | ASP | 2.248 | | | | |
| 7 | Ape. Stop | Plano | | 0.550 | | | | |
| 8 | Lens 4 | −6.131 | ASP | 2.181 | Plastic | 1.536 | 55.9 | 10.61 |
| 9 | | −3.318 | ASP | 0.317 | | | | |

TABLE 9-continued (5th Embodiment)
f = 1.24 mm, Fno = 3.60, HFOV = 86.6 deg.

| Surface # | | Curvature Radius | | Thickness | Material | Index | Abbe # | Focal Length |
|---|---|---|---|---|---|---|---|---|
| 10 | Lens 5 | 3.244 | ASP | 2.129 | Plastic | 1.536 | 55.9 | 3.73 |
| 11 | | −4.013 | ASP | 0.134 | | | | |
| 12 | Lens 6 | −4.187 | ASP | 1.018 | Plastic | 1.638 | 20.4 | −7.65 |
| 13 | | −32.258 | ASP | 0.634 | | | | |
| 14 | Filter | Plano | | 0.300 | Glass | 1.517 | 64.2 | — |
| 15 | | Plano | | 0.666 | | | | |
| 16 | Image Surface | Plano | | — | | | | |

Note:
Reference wavelength is 845.0 nm.

TABLE 10

Aspheric Coefficients

| Surface # | | | | |
|---|---|---|---|---|
| | 1 | 2 | 3 | 4 |
| k = | −1.1366E+00 | 1.2235E−01 | −1.8537E+01 | −1.8082E+00 |
| A4 = | 5.1142E−04 | −3.3812E−03 | −6.5991E−03 | −1.0772E−02 |
| A6 = | −1.3718E−06 | 5.2750E−06 | 2.9344E−04 | −4.8966E−04 |
| A8 = | 5.7845E−10 | −3.4938E−09 | −3.7165E−05 | 6.0621E−05 |

| Surface # | | | | |
|---|---|---|---|---|
| | 5 | 6 | 8 | 9 |
| k = | −7.3453E+01 | −3.4600E−01 | 1.5372E+01 | 8.1438E−02 |
| A4 = | −2.2681E−03 | 6.9325E−04 | −4.4894E−04 | −3.4021E−03 |
| A6 = | −1.3809E−04 | −3.7282E−04 | 9.8718E−03 | 7.0373E−04 |
| A8 = | −1.0930E−04 | −1.4722E−05 | −7.5590E−03 | −8.2412E−07 |

| Surface # | | | | |
|---|---|---|---|---|
| | 10 | 11 | 12 | 13 |
| k = | −1.6423E−01 | 1.6343E+00 | 1.4804E+00 | −8.9385E+01 |
| A4 = | 1.3330E−03 | 2.0986E−03 | −1.2063E−02 | 1.8855E−02 |
| A6 = | −8.7300E−04 | −3.3147E−03 | −1.4262E−03 | −9.6769E−03 |
| A8 = | 2.8533E−04 | 7.1977E−04 | 7.3293E−04 | 2.0926E−03 |
| A10 = | −4.4103E−05 | | | −1.3826E−04 |

In the 5th embodiment, the equation of the aspheric surface profiles of the aforementioned lens elements is the same as the equation from the 1st embodiment. Also, the definitions of the parameters shown in TABLE 11 below are the same as those stated in the 1st embodiment, but the values for the conditions in the 5th embodiment are as specified below; an explanation in this regard will not be provided again.

TABLE 11

5th Embodiment

| f [mm] | 1.24 | SD/TD | 0.38 |
|---|---|---|---|
| Fno. | 3.60 | R11/R12 | 0.13 |
| HFOV [deg.] | 86.6 | \|R4/R5\| | 0.12 |
| λ [nm] | 845.0 | (R1 + R2)/(R1 − R2) | 1.33 |
| \|1/tan(HFOV)\| | 0.06 | (R7 + R8)/(R7 − R8) | 3.36 |
| (V2 + V3)/2 | 27.00 | (R1 + R12)/(R1 − R12) | −0.25 |
| CT3/CT2 | 0.89 | (R9 + R12)/(R9 − R12) | −0.82 |
| CT4/T23 | 1.71 | \|f2/f5\| | 1.68 |
| T23/T45 | 4.01 | f/T12 | 0.52 |
| ΣCT/ΣAT | 1.42 | f/EPD | 3.60 |
| BL/ΣAT | 0.23 | | |

6th Embodiment

Figure 6A:
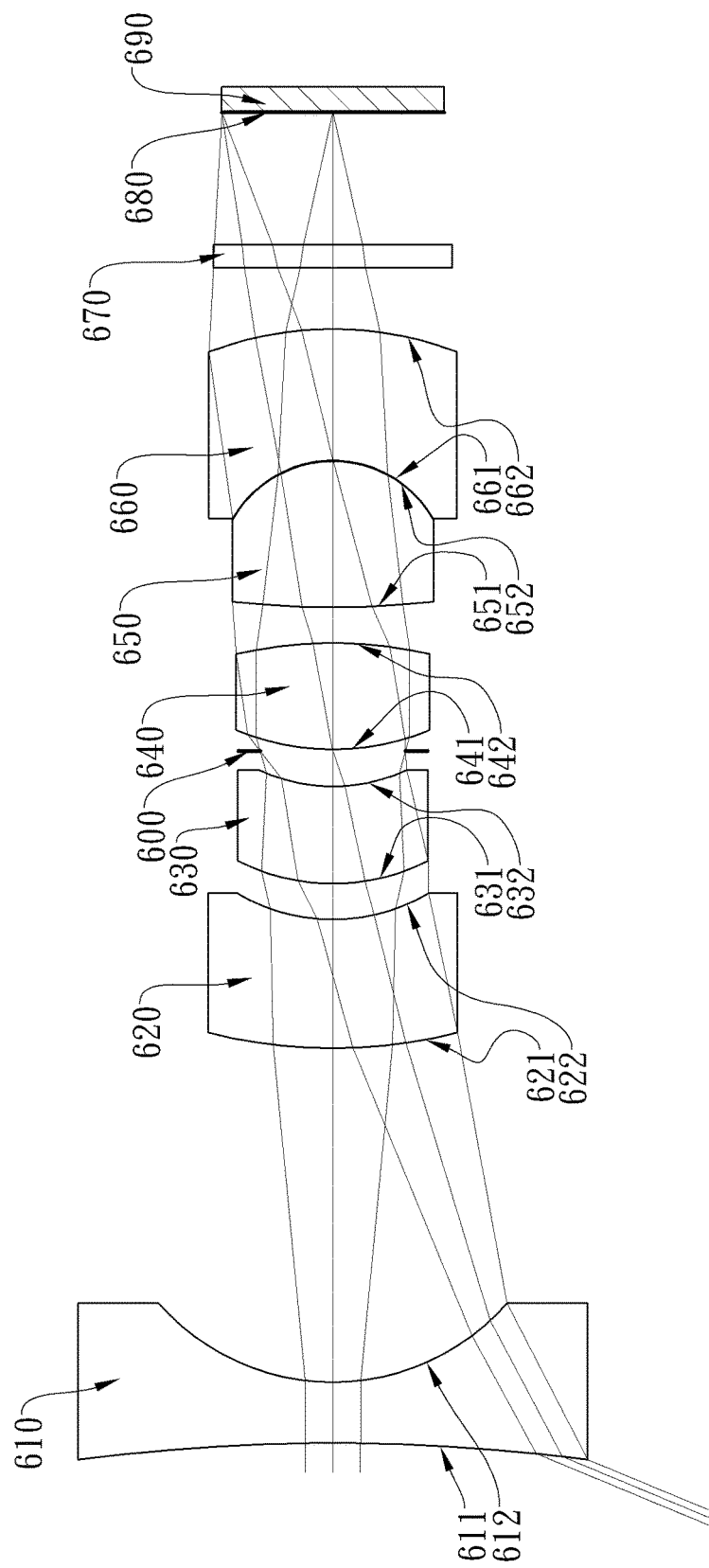
FIG. 6A is a schematic view of an image capturing apparatus according to the 6th embodiment of the present disclosure.
Figure 6B:
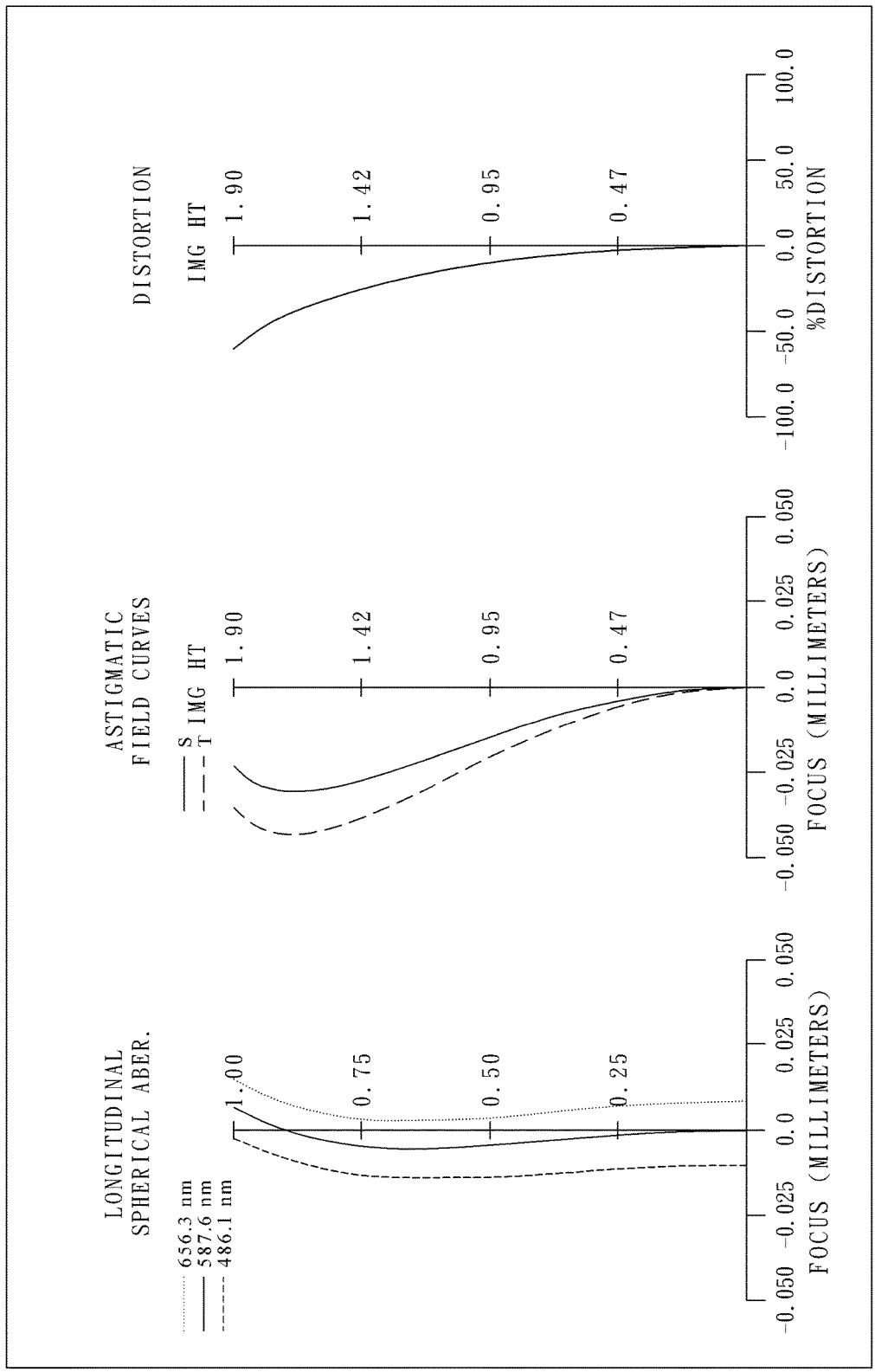
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, the image capturing apparatus comprises an optical imaging lens assembly (not otherwise herein labeled) of the present disclosure and an image sensor 690. The optical imaging lens assembly comprises, in order from an object side to an image side, a first lens element 610, a second lens element 620, a third lens element 630, an aperture stop 600, a fourth lens element 640, a fifth lens element 650, and a sixth lens element 660.

The first lens element 610 with negative refractive power has an object-side surface 611 being concave in a paraxial region thereof and an image-side surface 612 being concave in a paraxial region thereof, and the first lens element 610 is made of glass.

The second lens element 620 with negative refractive power has an object-side surface 621 being convex in a paraxial region thereof and an image-side surface 622 being concave in a paraxial region thereof, and the second lens element 620 is made of glass.

The third lens element 630 with positive refractive power has an object-side surface 631 being convex in a paraxial region thereof and an image-side surface 632 being concave in a paraxial region thereof, and the third lens element 630 is made of glass.

The fourth lens element 640 with positive refractive power has an object-side surface 641 being convex in a paraxial region thereof and an image-side surface 642 being convex in a paraxial region thereof, and the fourth lens element 640 is made of glass.

The fifth lens element 650 with positive refractive power has an object-side surface 651 being convex in a paraxial region thereof and an image-side surface 652 being convex in a paraxial region thereof, and the fifth lens element 650 is made of glass.

The sixth lens element 660 with negative refractive power has an object-side surface 661 being concave in a paraxial region thereof and an image-side surface 662 being convex in a paraxial region thereof, and the sixth lens element 660 is made of glass.

The optical imaging lens assembly further comprises a filter 670 located between the sixth lens element 660 and an image surface 680. The filter 670 is made of glass and will not affect the focal length of the optical imaging lens assembly. The image sensor 690 is disposed on or near the image surface 680 of the optical imaging lens assembly.

The detailed optical data of the 6th embodiment are shown in TABLE 12, wherein the units of the curvature radius, the thickness and the focal length are expressed in mm, and HFOV is half of a maximum field of view.

TABLE 12

(6th Embodiment)
f = 2.16 mm, Fno = 2.30, HFOV = 67.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −33.844 | 1.044 | Glass | 1.697 | 55.5 | −5.03 |
| 2 | | 3.963 | 5.711 | | | | |
| 3 | Lens 2 | 8.649 | 2.200 | Glass | 1.517 | 64.2 | −11.33 |
| 4 | | 3.188 | 0.614 | | | | |
| 5 | Lens 3 | 3.568 | 1.665 | Glass | 1.847 | 23.8 | 61.60 |
| 6 | | 3.011 | 0.606 | | | | |
| 7 | Ape. Stop | Plano | 0.027 | | | | |
| 8 | Lens 4 | 4.350 | 1.818 | Glass | 1.804 | 46.5 | 3.65 |
| 9 | | −7.343 | 0.612 | | | | |
| 10 | Lens 5 | 16.294 | 2.497 | Glass | 1.678 | 55.2 | 2.75 |
| 11 | | −1.971 | 0.013 | Cement | 1.514 | 38.8 | |
| 12 | Lens 6 | −1.971 | 2.248 | Glass | 1.847 | 23.8 | −4.70 |
| 13 | | −5.947 | 1.044 | | | | |
| 14 | Filter | Plano | 0.400 | Glass | 1.517 | 64.2 | — |
| 15 | | Plano | 2.257 | | | | |
| 16 | Image Surface | Plano | — | | | | |

Note:
Reference wavelength is d-line 587.6 nm.

In the 6th embodiment, the equation of the aspheric surface profiles of the aforementioned lens elements is the same as the equation from the 1st embodiment. Also, the definitions of the parameters shown in TABLE 13 below are the same as those stated in the 1st embodiment, but the values for the conditions in the 6th embodiment are as specified below; an explanation in this regard will not be provided again.

TABLE 13

6th Embodiment

| f [mm] | 2.16 | SD/TD | 0.38 |
|---|---|---|---|
| Fno. | 2.30 | R11/R12 | 0.33 |
| HFOV [deg.] | 67.5 | |R4/R5| | 0.89 |
| λ [nm] | 587.6 | (R1 + R2)/(R1 − R2) | 0.79 |
| |1/tan(HFOV)| | 0.42 | (R7 + R8)/(R7 − R8) | −0.26 |
| (V2 + V3)/2 | 44.00 | (R1 + R12)/(R1 − R12) | 1.43 |
| CT3/CT2 | 0.76 | (R9 + R12)/(R9 − R12) | 0.47 |
| CT4/T23 | 2.96 | |f2/f5| | 4.13 |
| T23/T45 | 1.00 | f/T12 | 0.38 |
| ΣCT/ΣAT | 1.51 | f/EPD | 2.30 |
| BL/ΣAT | 0.49 | | |

7th Embodiment

Figure 7A:
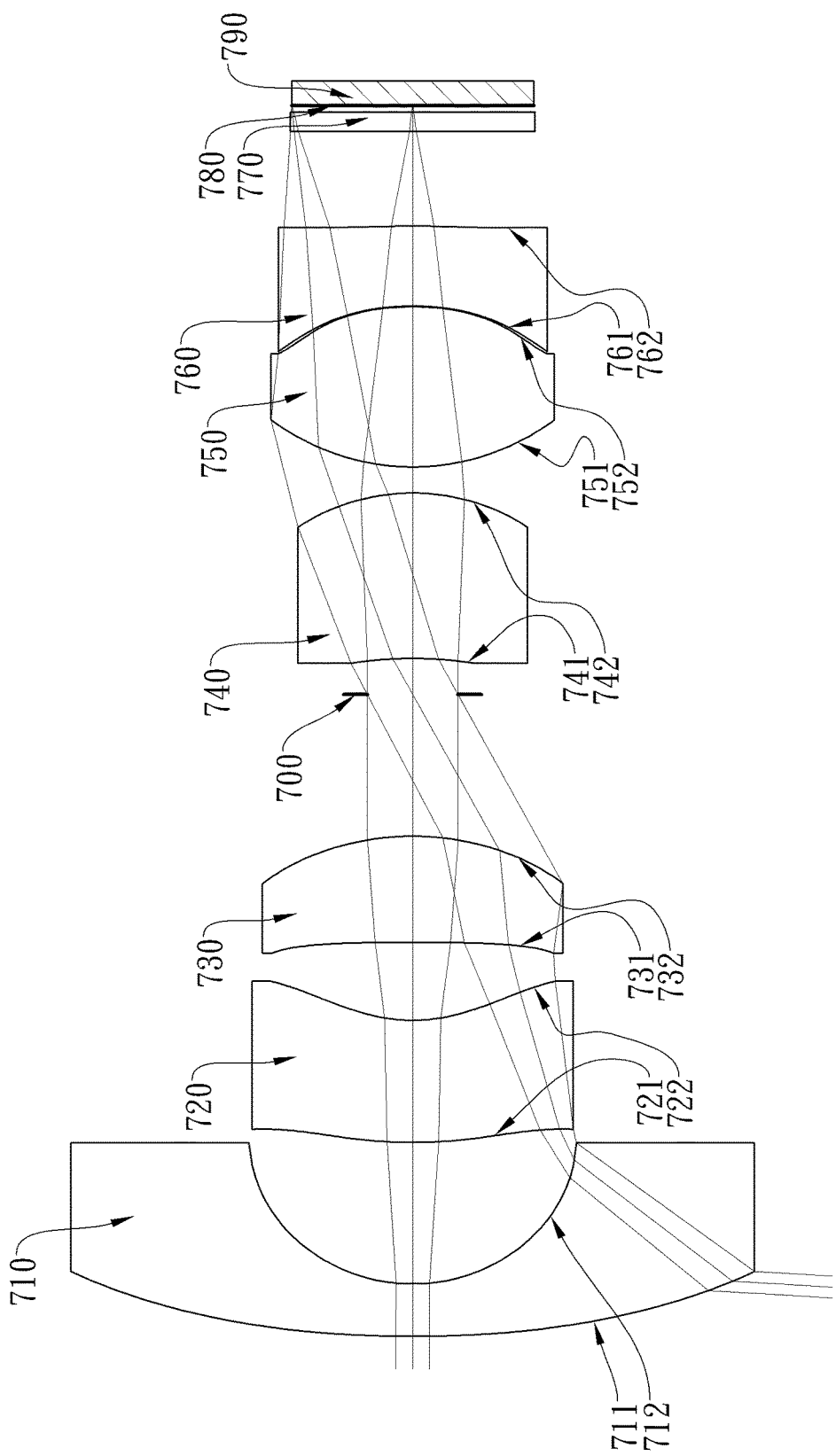
FIG. 7A is a schematic view of an image capturing apparatus according to the 7th embodiment of the present disclosure.
Figure 7B:
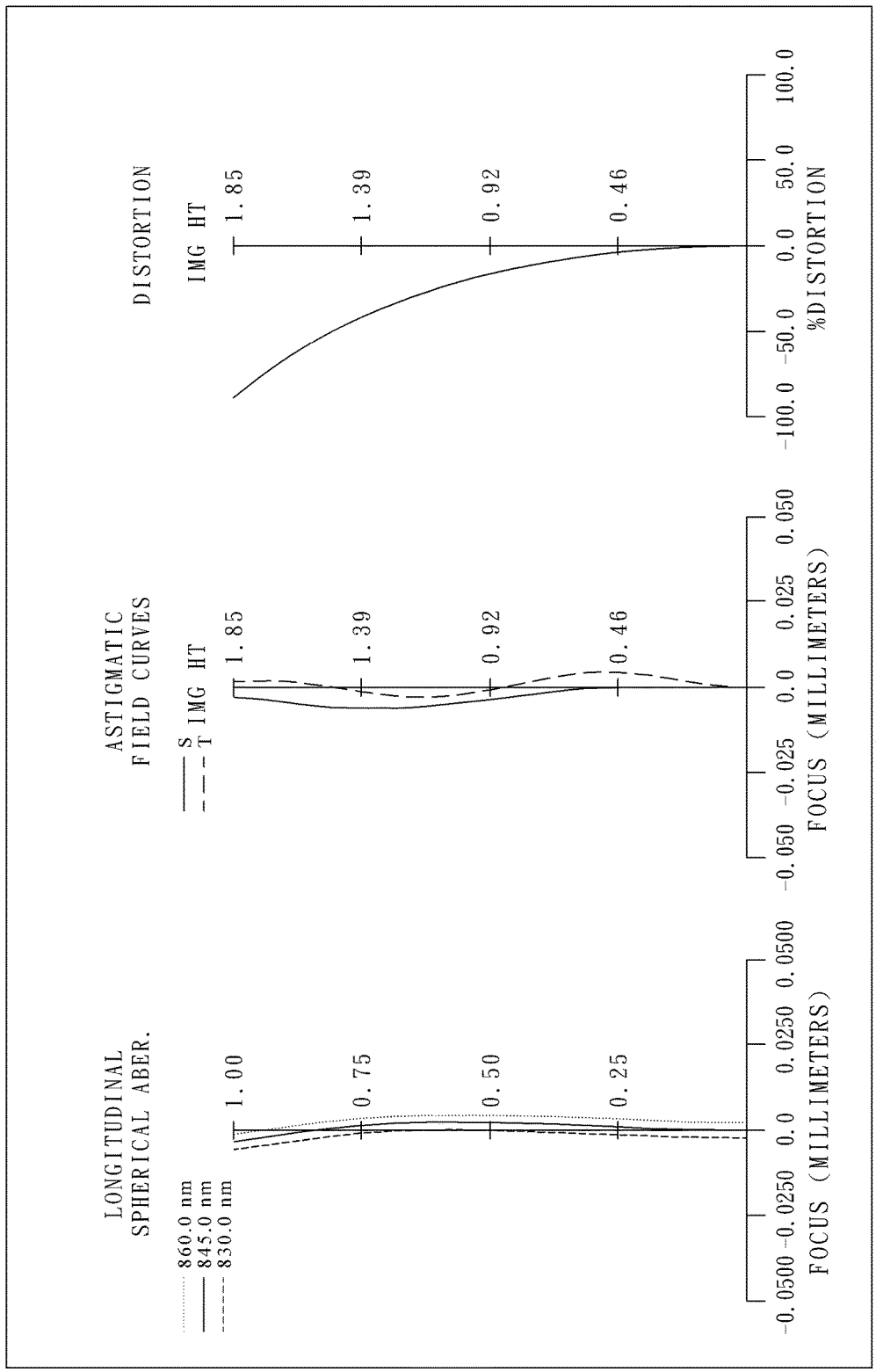
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, the image capturing apparatus comprises an optical imaging lens assembly (not otherwise herein labeled) of the present disclosure and an image sensor 790. The optical imaging lens assembly comprises, in order from an object side to an image side, a first lens element 710, a second lens element 720, a third lens element 730, an aperture stop 700, a fourth lens element 740, a fifth lens element 750, and a sixth lens element 760.

The first lens element 710 with negative refractive power has an object-side surface 711 being convex in a paraxial region thereof and an image-side surface 712 being concave in a paraxial region thereof, and the first lens element 710 is made of glass.

The second lens element 720 with negative refractive power has an object-side surface 721 being convex in a paraxial region thereof and an image-side surface 722 being concave in a paraxial region thereof, and the second lens element 720 is made of plastic.

The third lens element 730 with positive refractive power has an object-side surface 731 being concave in a paraxial region thereof and an image-side surface 732 being convex in a paraxial region thereof, and the third lens element 730 is made of glass.

The fourth lens element 740 with positive refractive power has an object-side surface 741 being concave in a paraxial region thereof and an image-side surface 742 being convex in a paraxial region thereof, and the fourth lens element 740 is made of plastic.

The fifth lens element 750 with positive refractive power has an object-side surface 751 being convex in a paraxial region thereof and an image-side surface 752 being convex in a paraxial region thereof, and the fifth lens element 750 is made of plastic.

The sixth lens element 760 with negative refractive power has an object-side surface 761 being concave in a paraxial region thereof and an image-side surface 762 being convex in a paraxial region thereof, and the sixth lens element 760 is made of plastic.

The optical imaging lens assembly further comprises a filter 770 located between the sixth lens element 760 and an image surface 780. The filter 770 is made of glass and will not affect the focal length of the optical imaging lens assembly. The image sensor 790 is disposed on or near the image surface 780 of the optical imaging lens assembly.

The detailed optical data of the 7th embodiment are shown in TABLE 14, and the aspheric surface data are shown in TABLE 15, wherein the units of the curvature radius, the thickness and the focal length are expressed in mm, and HFOV is half of a maximum field of view.

In the 7th embodiment, the equation of the aspheric surface profiles of the aforementioned lens elements is the same as the equation from the 1st embodiment. Also, the definitions of the parameters shown in TABLE 16 below are the same as those stated in the 1st embodiment, but the

TABLE 14

(7th Embodiment)
f = 1.42 mm, Fno = 2.72, HFOV = 86.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 17.677 | ASP | 0.803 | Glass | 1.791 | 40.7 | −4.10 |
| 2 | | 2.685 | ASP | 2.163 | | | | |
| 3 | Lens 2 | 6.097 | ASP | 1.872 | Plastic | 1.569 | 30.2 | −8.80 |
| 4 | | 2.443 | ASP | 1.193 | | | | |
| 5 | Lens 3 | −54.0344 | ASP | 1.625 | Glass | 1.821 | 23.8 | 5.39 |
| 6 | | −4.142 | ASP | 2.171 | | | | |
| 7 | Ape. Stop | Plano | | 0.550 | | | | |
| 8 | Lens 4 | −6.446 | ASP | 2.532 | Plastic | 1.536 | 55.9 | 9.70 |
| 9 | | −3.273 | ASP | 0.400 | | | | |
| 10 | Lens 5 | 3.586 | ASP | 2.453 | Plastic | 1.536 | 55.9 | 3.92 |
| 11 | | −3.863 | ASP | 0.010 | Cement | 1.503 | 38.8 | |
| 12 | Lens 6 | −4.0412 | ASP | 1.223 | Plastic | 1.638 | 20.4 | −8.16 |
| 13 | | −20.227 | ASP | 1.448 | | | | |
| 14 | Filter | Plano | | 0.300 | Glass | 1.517 | 64.2 | — |
| 15 | | Plano | | 0.100 | | | | |
| 16 | Image Surface | Plano | | — | | | | |

Note:
Reference wavelength is 845.0 nm.

TABLE 15

Aspheric Coefficients

| | Surface # | | | |
|---|---|---|---|---|
| | 1 | 2 | 3 | 4 |
| k = | −5.2033E−01 | 1.4400E−01 | −9.6772E+00 | −1.7008E+00 |
| A4 = | 3.0295E−04 | −1.3773E−03 | −4.6149E−03 | −1.0605E−02 |
| A6 = | −7.1407E−07 | 1.1984E−06 | 1.1450E−05 | −4.9628E−04 |
| A8 = | 3.1970E−10 | −9.1466E−10 | −1.5359E−05 | 5.1739E−05 |

| | Surface # | | | |
|---|---|---|---|---|
| | 5 | 6 | 8 | 9 |
| k = | −3.7450E+01 | −2.8401E−01 | 1.5474E+01 | −2.0040E−02 |
| A4 = | −2.6491E−03 | 5.2400E−04 | 2.3514E−04 | −1.1792E−03 |
| A6 = | −1.5900E−04 | −3.4407E−04 | 4.6162E−03 | 4.1358E−04 |
| A8 = | −1.0987E−04 | −1.7304E−05 | −1.6643E−03 | −1.6745E−04 |

| | Surface # | | | |
|---|---|---|---|---|
| | 10 | 11 | 12 | 13 |
| k = | −1.8129E−01 | 1.0176E+00 | −1.0106E+00 | −8.8224E+01 |
| A4 = | 1.1085E−03 | −4.9101E−03 | −1.5749E−02 | 5.9737E−03 |
| A6 = | −1.6804E−04 | −5.9549E−03 | 6.9182E−04 | −3.3973E−04 |
| A8 = | −7.3942E−06 | 1.5001E−03 | 1.7310E−04 | −6.9058E−05 |
| A10 = | 1.1721E−06 | | | 5.5426E−06 | values for the conditions in the 7th embodiment are as specified below; an explanation in this regard will not be provided again.

TABLE 16

| 7th Embodiment | | | |
|---|---|---|---|
| f [mm] | 1.42 | SD/TD | 0.42 |
| Fno. | 2.72 | R11/R12 | 0.20 |
| HFOV [deg.] | 86.5 | |R4/R5| | 0.05 |
| λ [nm] | 845.0 | (R1 + R2)/(R1 − R2) | 1.36 |
| |1/tan(HFOV)| | 0.06 | (R7 + R8)/(R7 − R8) | 3.06 |
| (V2 + V3)/2 | 27.00 | (R1 + R12)/(R1 − R12) | −0.07 |
| CT3/CT2 | 0.87 | (R9 + R12)/(R9 − R12) | −0.70 |
| CT4/T23 | 2.12 | |f2/f5| | 2.25 |
| T23/T45 | 2.98 | f/T12 | 0.66 |
| ΣCT/ΣAT | 1.62 | f/EPD | 2.72 |
| BL/ΣAT | 0.28 | | |

8th Embodiment

Figure 8A:
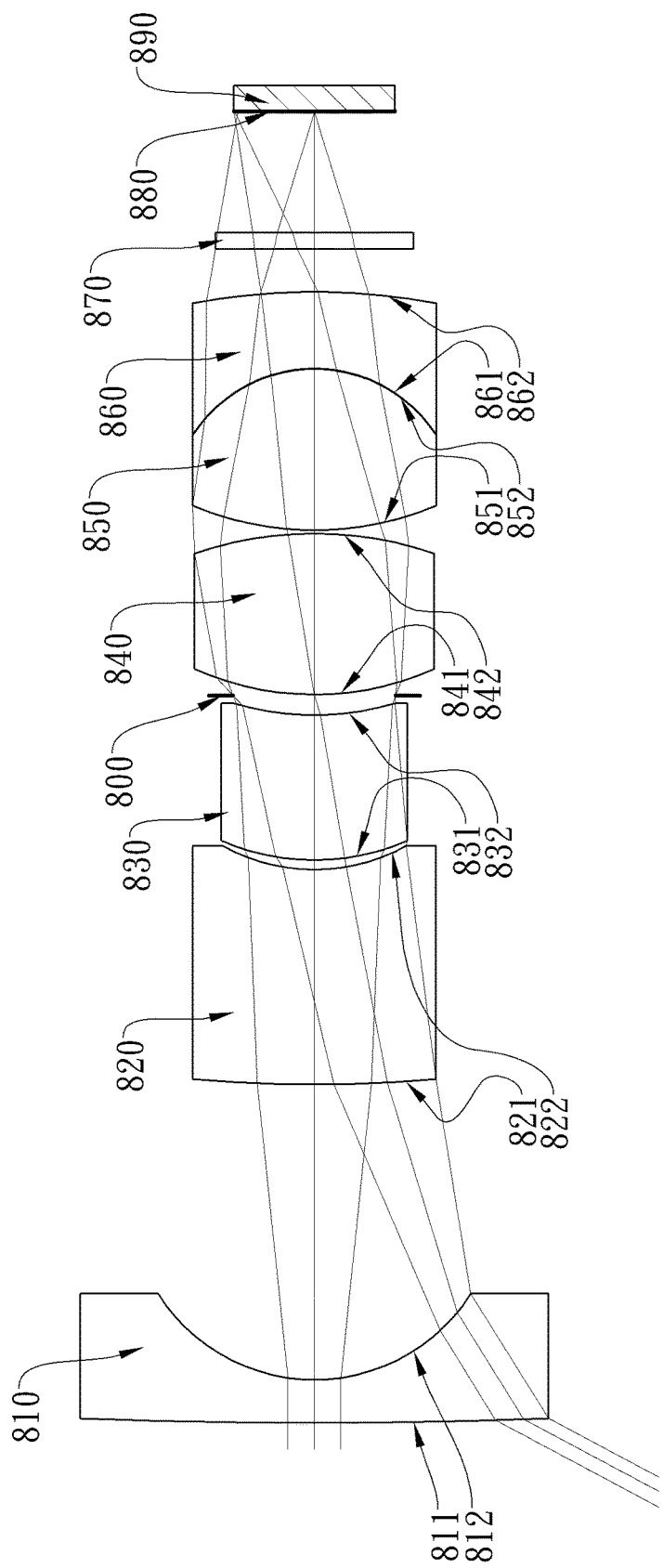
FIG. 8A is a schematic view of an image capturing apparatus according to the 8th embodiment of the present disclosure.
Figure 8B:
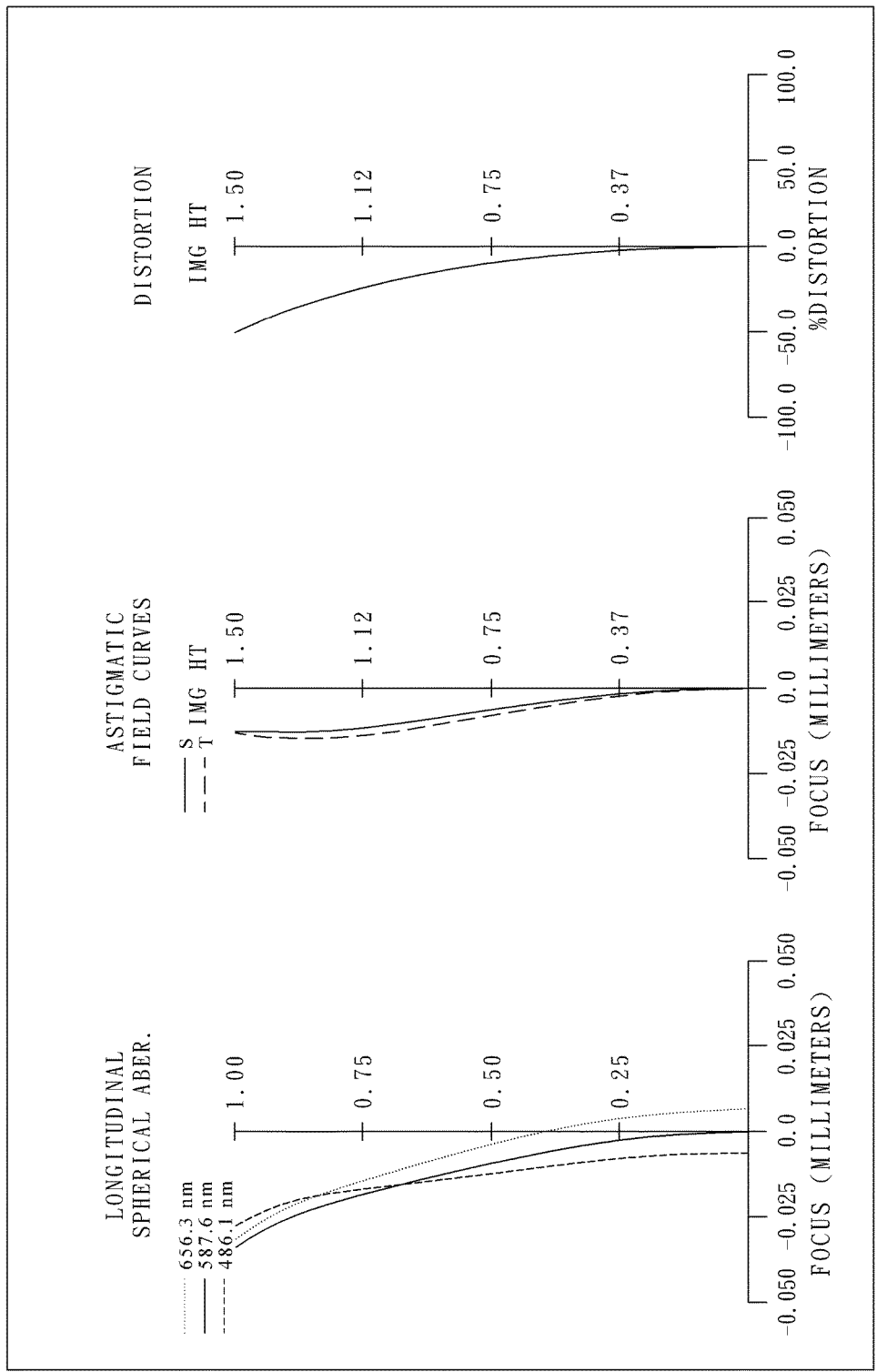
FIG. 8B shows longitudinal spherical aberration curves, astigmatic field curves and a distortion curve of the image capturing apparatus according to the 8th embodiment.

FIG. 8A is a schematic view of an image capturing apparatus according to the 8th embodiment of the present disclosure. FIG. 8B shows, in order from left to right, longitudinal spherical aberration curves, astigmatic field curves and a distortion curve of the image capturing apparatus according to the 8th embodiment.

In FIG. 8A, the image capturing apparatus comprises an optical imaging lens assembly (not otherwise herein labeled) of the present disclosure and an image sensor 890. The optical imaging lens assembly comprises, in order from an object side to an image side, a first lens element 810, a second lens element 820, a third lens element 830, an aperture stop 800, a fourth lens element 840, a fifth lens element 850, and a sixth lens element 860.

The first lens element 810 with negative refractive power has an object-side surface 811 being convex in a paraxial region thereof and an image-side surface 812 being concave in a paraxial region thereof, and the first lens element 810 is made of glass.

The second lens element 820 with negative refractive power has an object-side surface 821 being convex in a paraxial region thereof and an image-side surface 822 being concave in a paraxial region thereof, and the second lens element 820 is made of glass.

The third lens element 830 with positive refractive power has an object-side surface 831 being convex in a paraxial region thereof and an image-side surface 832 being concave in a paraxial region thereof, and the third lens element 830 is made of glass.

The fourth lens element 840 with positive refractive power has an object-side surface 841 being convex in a paraxial region thereof and an image-side surface 842 being convex in a paraxial region thereof, and the fourth lens element 840 is made of glass.

The fifth lens element 850 with positive refractive power has an object-side surface 851 being convex in a paraxial region thereof and an image-side surface 852 being convex in a paraxial region thereof, and the fifth lens element 850 is made of glass.

The sixth lens element 860 with negative refractive power has an object-side surface 861 being concave in a paraxial region thereof and an image-side surface 862 being convex in a paraxial region thereof, and the sixth lens element 860 is made of glass.

The optical imaging lens assembly further comprises a filter 870 located between the sixth lens element 860 and an image surface 880. The filter 870 is made of glass and will not affect the focal length of the optical imaging lens assembly. The image sensor 890 is disposed on or near the image surface 880 of the optical imaging lens assembly.

The detailed optical data of the 8th embodiment are shown in TABLE 17, wherein the units of the curvature radius, the thickness and the focal length are expressed in mm, and HFOV is half of a maximum field of view.

TABLE 17

| (8th Embodiment) f = 1.68 mm, Fno = 1.70, HFOV = 61.9 deg. | | | | | | |
|---|---|---|---|---|---|---|
| Surface # | | Curvature Radius | Thickness | Material | Index | Abbe # | Focal Length |
| 0 | Object | Plano | Infinity | | | | |
| 1 | Lens 1 | 118.493 | 0.800 | Glass | 1.733 | 54.0 | −4.86 |
| 2 | | 3.447 | 5.500 | | | | |
| 3 | Lens 2 | 27.211 | 4.000 | Glass | 1.779 | 40.6 | −5.63 |
| 4 | | 3.531 | 0.177 | | | | |
| 5 | Lens 3 | 4.330 | 2.700 | Glass | 1.847 | 23.8 | 12.58 |
| 6 | | 5.212 | 0.363 | | | | |
| 7 | Ape. Stop | Plano | 0.020 | | | | |
| 8 | Lens 4 | 5.483 | 3.000 | Glass | 1.804 | 46.5 | 4.23 |
| 9 | | −6.792 | 0.060 | | | | |
| 10 | Lens 5 | 5.863 | 3.000 | Glass | 1.678 | 55.2 | 3.18 |
| 11 | | −2.698 | 0.010 | Cement | 1.514 | 38.8 | |
| 12 | Lens 6 | −2.698 | 1.427 | Glass | 1.847 | 23.8 | −4.39 |
| 13 | | −12.233 | 0.799 | | | | |
| 14 | Filter | Plano | 0.300 | Glass | 1.517 | 64.2 | — |
| 15 | | Plano | 2.263 | | | | |
| 16 | Image Surface | Plano | — | | | | |

Note:
Reference wavelength is d-line 587.6 nm.

In the 8th embodiment, the equation of the aspheric surface profiles of the aforementioned lens elements is the same as the equation from the 1st embodiment. Also, the definitions of the parameters shown in TABLE 18 below are the same as those stated in the 1st embodiment, but the values for the conditions in the 8th embodiment are as specified below; an explanation in this regard will not be provided again.

TABLE 18

| 8th Embodiment | | | |
|---|---|---|---|
| f [mm] | 1.68 | SD/TD | 0.36 |
| Fno. | 1.70 | R11/R12 | 0.22 |
| HFOV [deg.] | 61.9 | |R4/R5| | 0.82 |
| λ [nm] | 587.6 | (R1 + R2)/(R1 − R2) | 1.06 |
| |1/tan(HFOV)| | 0.53 | (R7 + R8)/(R7 − R8) | −0.11 |
| (V2 + V3)/2 | 32.20 | (R1 + R12)/(R1 − R12) | 0.81 |
| CT3/CT2 | 0.68 | (R9 + R12)/(R9 − R12) | −0.35 |
| CT4/T23 | 16.93 | |f2/f5| | 1.77 |
| T23/T45 | 2.95 | f/T12 | 0.30 |
| ΣCT/ΣAT | 2.44 | f/EPD | 1.70 |
| BL/ΣAT | 0.55 | | |

9th Embodiment

Figure 9A:
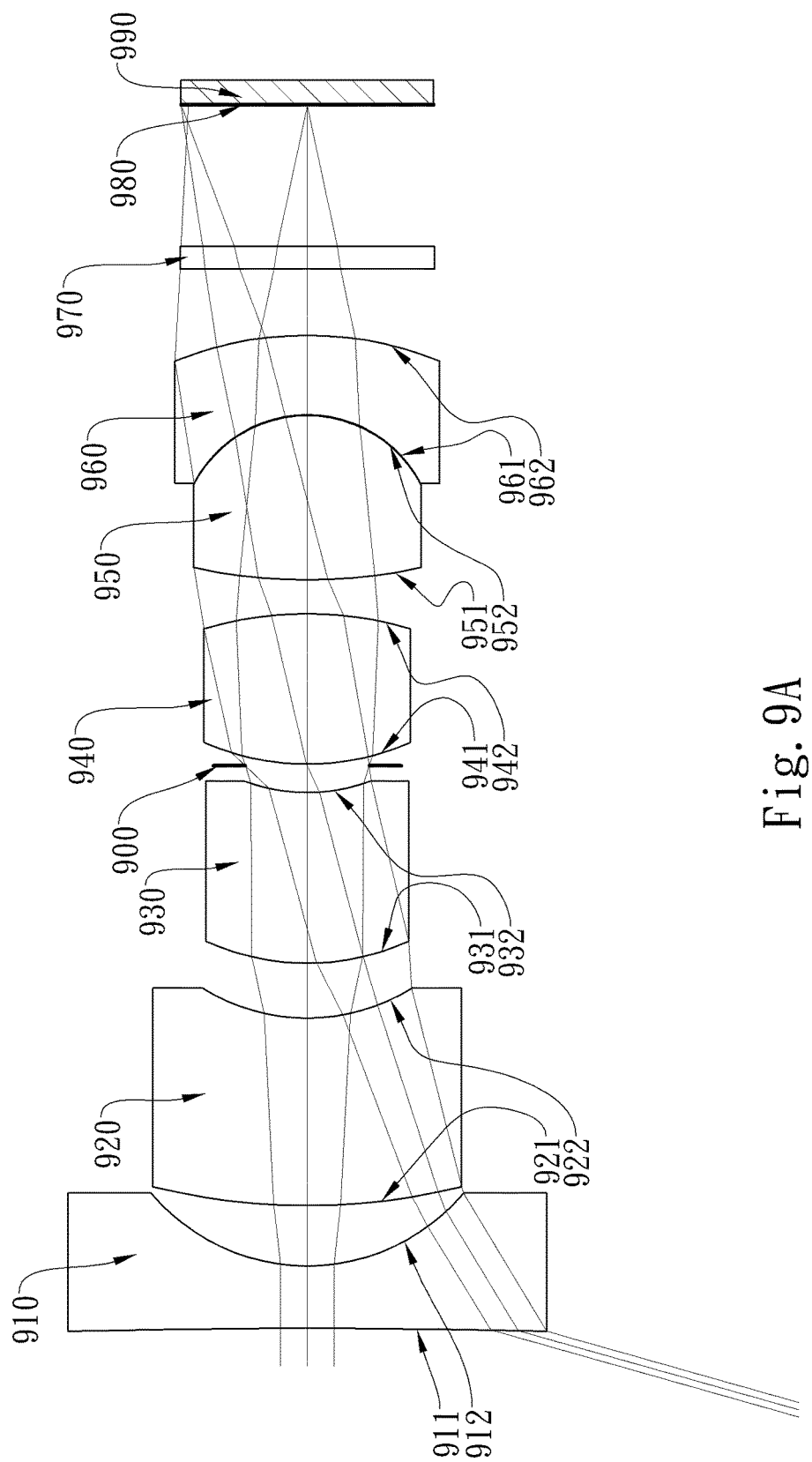
FIG. 9A is a schematic view of an image capturing apparatus according to the 9th embodiment of the present disclosure.
Figure 9B:
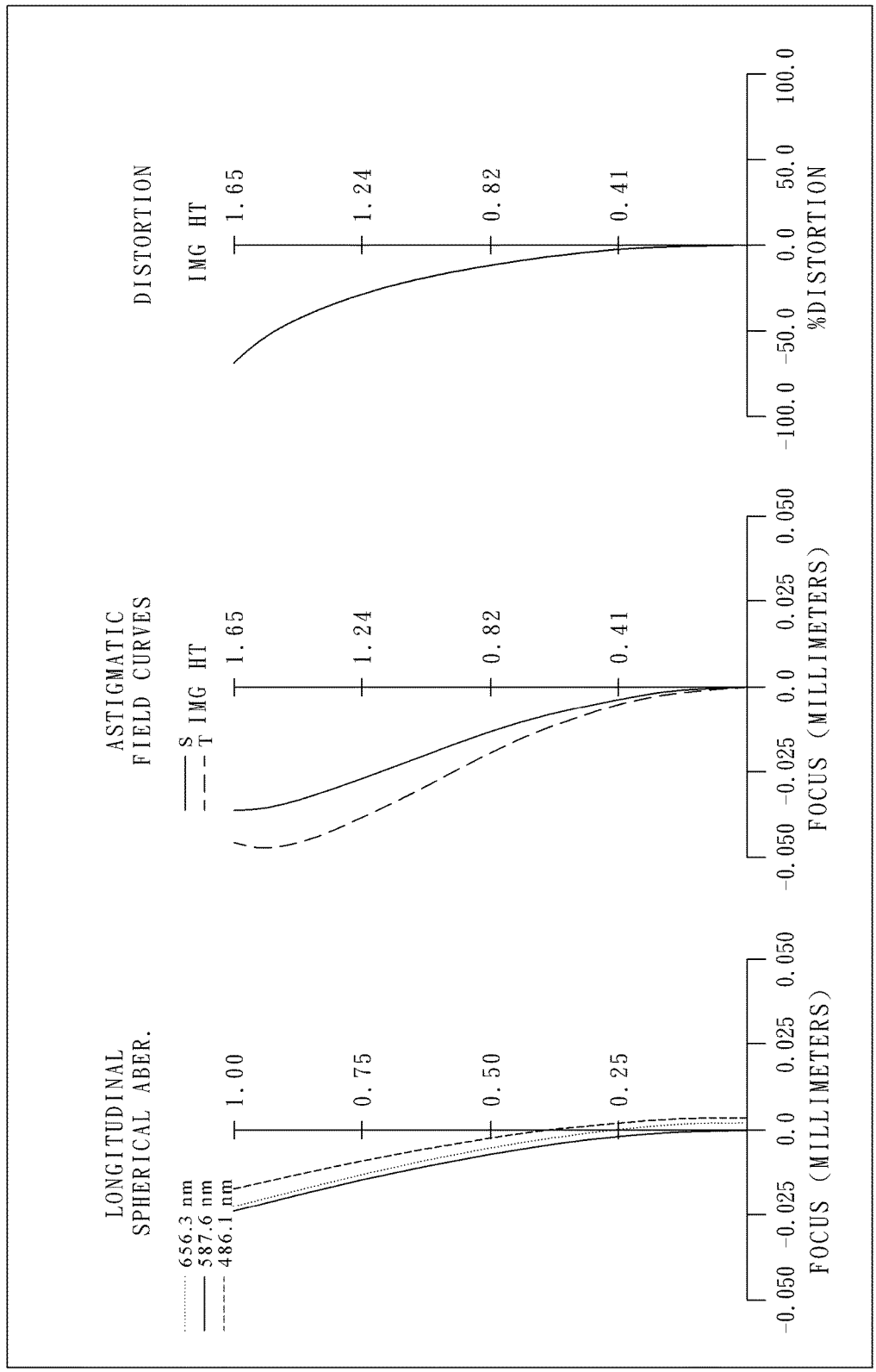
FIG. 9B shows longitudinal spherical aberration curves, astigmatic field curves and a distortion curve of the image capturing apparatus according to the 9th embodiment.

FIG. 9A is a schematic view of an image capturing apparatus according to the 9th embodiment of the present disclosure. FIG. 9B shows, in order from left to right, longitudinal spherical aberration curves, astigmatic field curves and a distortion curve of the image capturing apparatus according to the 9th embodiment.

In FIG. 9A, the image capturing apparatus comprises an optical imaging lens assembly (not otherwise herein labeled) of the present disclosure and an image sensor 990. The optical imaging lens assembly comprises, in order from an object side to an image side, a first lens element 910, a second lens element 920, a third lens element 930, an aperture stop 900, a fourth lens element 940, a fifth lens element 950, and a sixth lens element 960.

The first lens element 910 with negative refractive power has an object-side surface 911 being concave in a paraxial region thereof and an image-side surface 912 being concave in a paraxial region thereof, and the first lens element 910 is made of glass.

The second lens element 920 with negative refractive power has an object-side surface 921 being convex in a paraxial region thereof and an image-side surface 922 being concave in a paraxial region thereof, and the second lens element 920 is made of glass.

The third lens element 930 with positive refractive power has an object-side surface 931 being convex in a paraxial region thereof and an image-side surface 932 being concave in a paraxial region thereof, and the third lens element 930 is made of glass.

The fourth lens element 940 with positive refractive power has an object-side surface 941 being convex in a paraxial region thereof and an image-side surface 942 being convex in a paraxial region thereof, and the fourth lens element 940 is made of glass.

The fifth lens element 950 with positive refractive power has an object-side surface 951 being convex in a paraxial region thereof and an image-side surface 952 being convex in a paraxial region thereof, and the fifth lens element 950 is made of glass.

The sixth lens element 960 with negative refractive power has an object-side surface 961 being concave in a paraxial region thereof and an image-side surface 962 being convex in a paraxial region thereof, and the sixth lens element 960 is made of glass.

The optical imaging lens assembly further comprises a filter 970 located between the sixth lens element 960 and an image surface 980. The filter 970 is made of glass and will not affect the focal length of the optical imaging lens assembly. The image sensor 990 is disposed on or near the image surface 980 of the optical imaging lens assembly.

The detailed optical data of the 9th embodiment are shown in TABLE 19, wherein the units of the curvature radius, the thickness and the focal length are expressed in mm, and HFOV is half of a maximum field of view.

TABLE 19

(9th Embodiment)
f = 1.68 mm, Fno = 2.40, HFOV = 74.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −119.108 | 0.812 | Glass | 1.799 | 42.3 | −3.24 |
| 2 | | 2.657 | 0.788 | | | | |
| 3 | Lens 2 | 8.343 | 2.449 | Glass | 1.564 | 60.8 | −7.82 |
| 4 | | 2.580 | 0.718 | | | | |
| 5 | Lens 3 | 3.218 | 2.227 | Glass | 1.847 | 23.8 | 53.99 |
| 6 | | 2.363 | 0.350 | | | | |
| 7 | Ape. Stop | Plano | 0.020 | | | | |
| 8 | Lens 4 | 3.340 | 1.965 | Glass | 1.804 | 46.5 | 2.74 |
| 9 | | −4.757 | 0.442 | | | | |
| 10 | Lens 5 | 6.890 | 2.147 | Glass | 1.678 | 55.2 | 2.21 |

TABLE 19-continued (9th Embodiment)
f = 1.68 mm, Fno = 2.40, HFOV = 74.2 deg.

| Surface # | | Curvature Radius | Thickness | Material | Index | Abbe # | Focal Length |
|---|---|---|---|---|---|---|---|
| 11 | | −1.669 | 0.010 | Cement | 1.514 | 38.8 | |
| 12 | Lens 6 | −1.669 | 1.039 | Glass | 1.847 | 23.8 | −3.71 |
| 13 | | −4.581 | 0.862 | | | | |
| 14 | Filter | Plano | 0.300 | Glass | 1.517 | 64.2 | — |
| 15 | | Plano | 1.847 | | | | |
| 16 | Image Surface | Plano | — | | | | |

Note:
Reference wavelength is d-line 587.6 nm.

In the 9th embodiment, the equation of the aspheric surface profiles of the aforementioned lens elements is the same as the equation from the 1st embodiment. Also, the definitions of the parameters shown in TABLE 20 below are the same as those stated in the 1st embodiment, but the values for the conditions in the 9th embodiment are as specified below; an explanation in this regard will not be provided again.

TABLE 20

9th Embodiment

| | | | |
|---|---|---|---|
| f [mm] | 1.68 | SD/TD | 0.43 |
| Fno. | 2.40 | R11/R12 | 0.36 |
| HFOV [deg.] | 74.2 | |R4/R5| | 0.80 |
| λ [nm] | 587.6 | (R1 + R2)/(R1 − R2) | 0.96 |
| |1/tan(HFOV)| | 0.28 | (R7 + R8)/(R7 − R8) | −0.18 |
| (V2 + V3)/2 | 42.30 | (R1 + R12)/(R1 − R12) | 1.08 |
| CT3/CT2 | 0.91 | (R9 + R12)/(R9 − R12) | 0.20 |
| CT4/T23 | 2.73 | |f2/f5| | 3.55 |
| T23/T45 | 1.63 | f/T12 | 2.13 |
| ΣCT/ΣAT | 4.57 | f/EPD | 2.40 |
| BL/ΣAT | 1.29 | | |

10th Embodiment

Figure 10A:
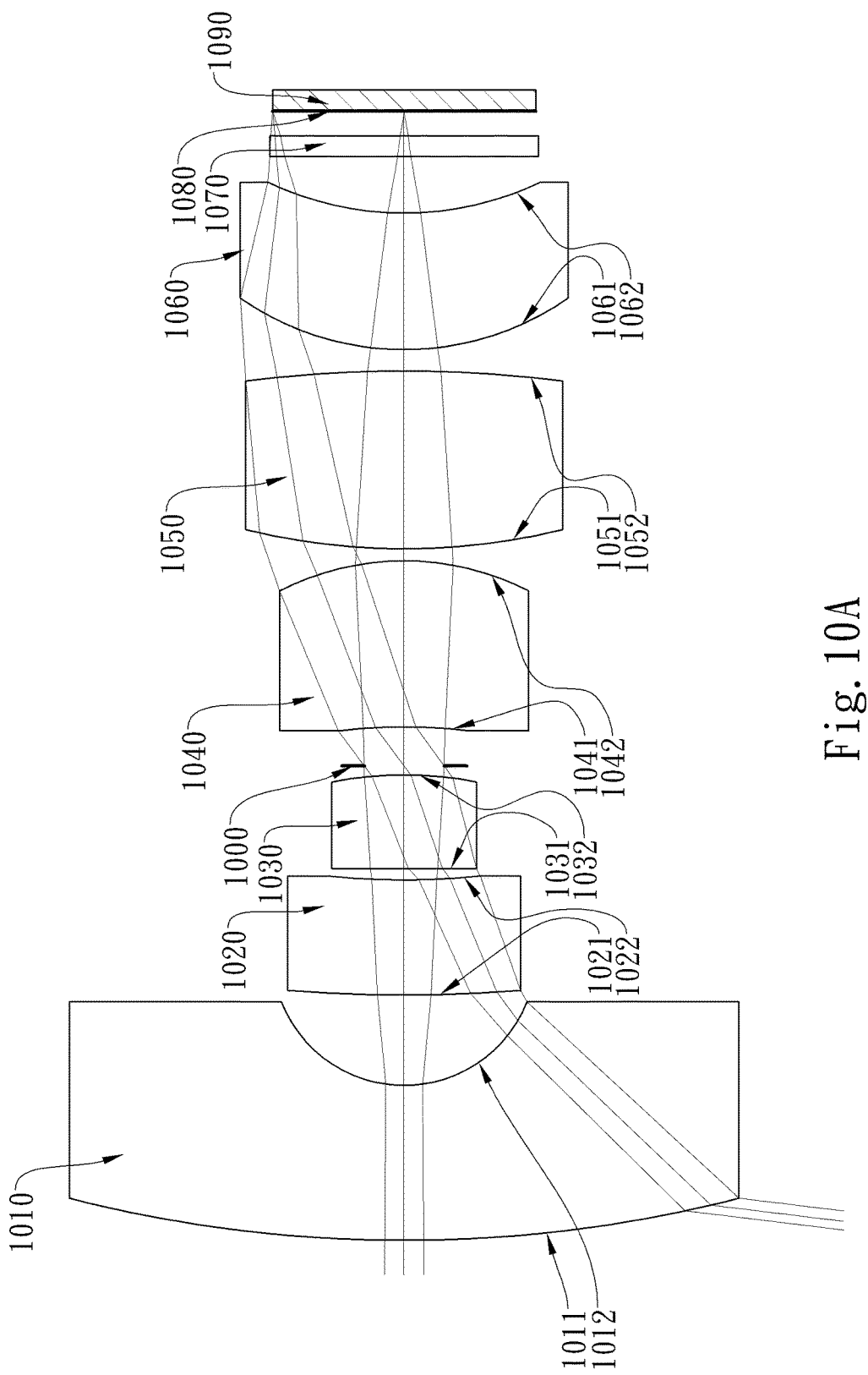
FIG. 10A is a schematic view of an image capturing apparatus according to the 10th embodiment of the present disclosure.
Figure 10B:
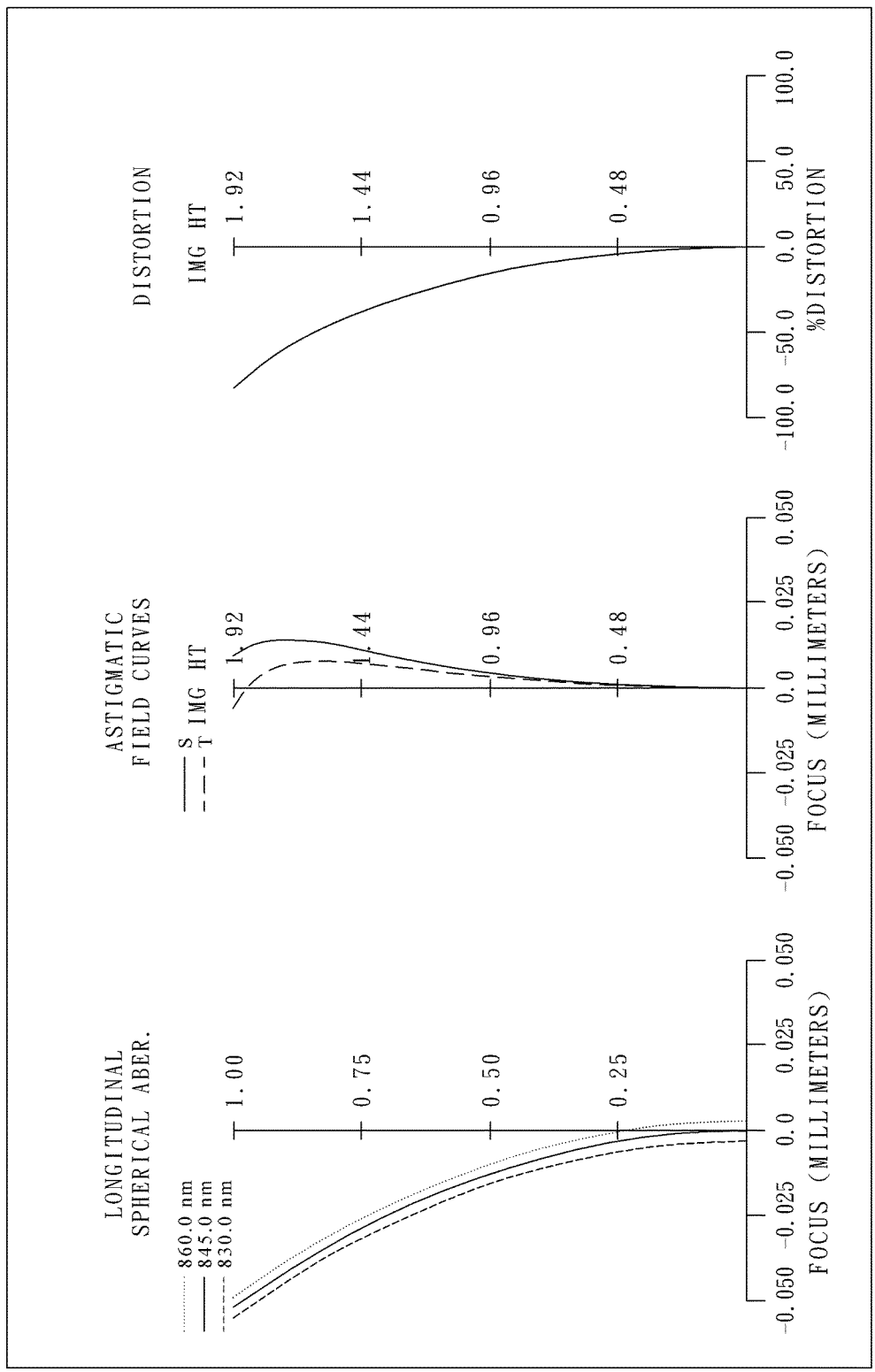
FIG. 10B shows longitudinal spherical aberration curves, astigmatic field curves and a distortion curve of the image capturing apparatus according to the 10th embodiment.
Figure 11A:
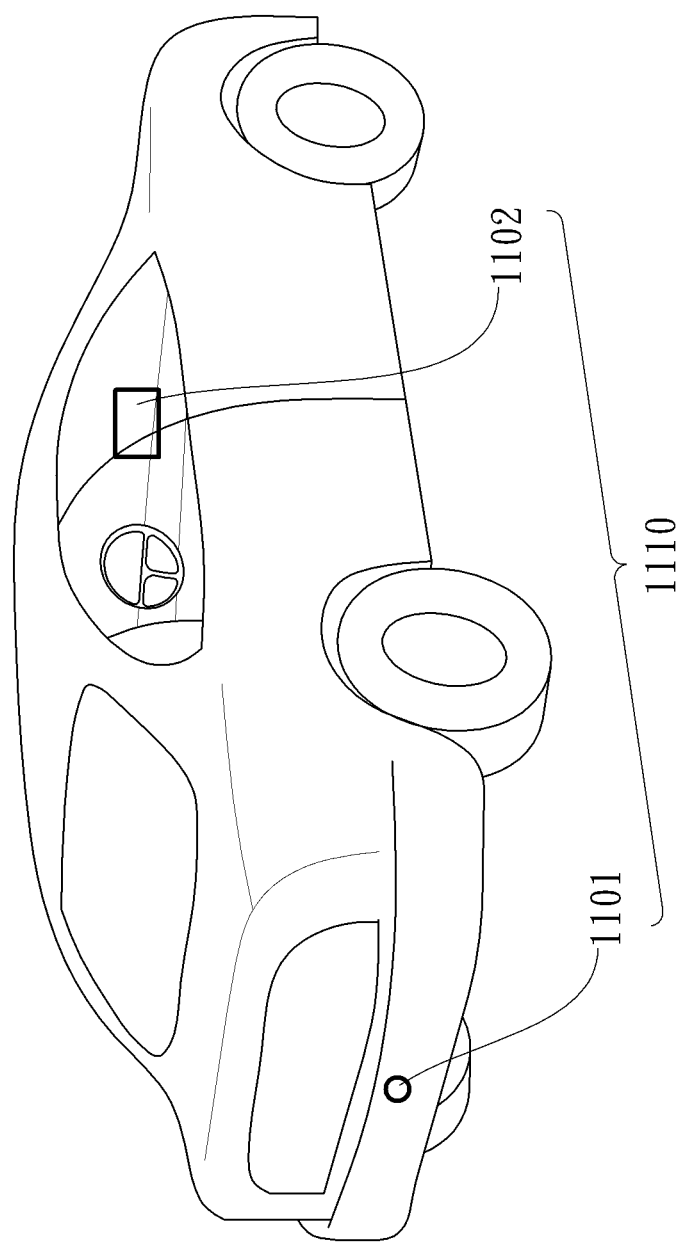
FIG. 11A shows a rear view camera with an image capturing apparatus of the present disclosure installed therein.
Figure 11B:
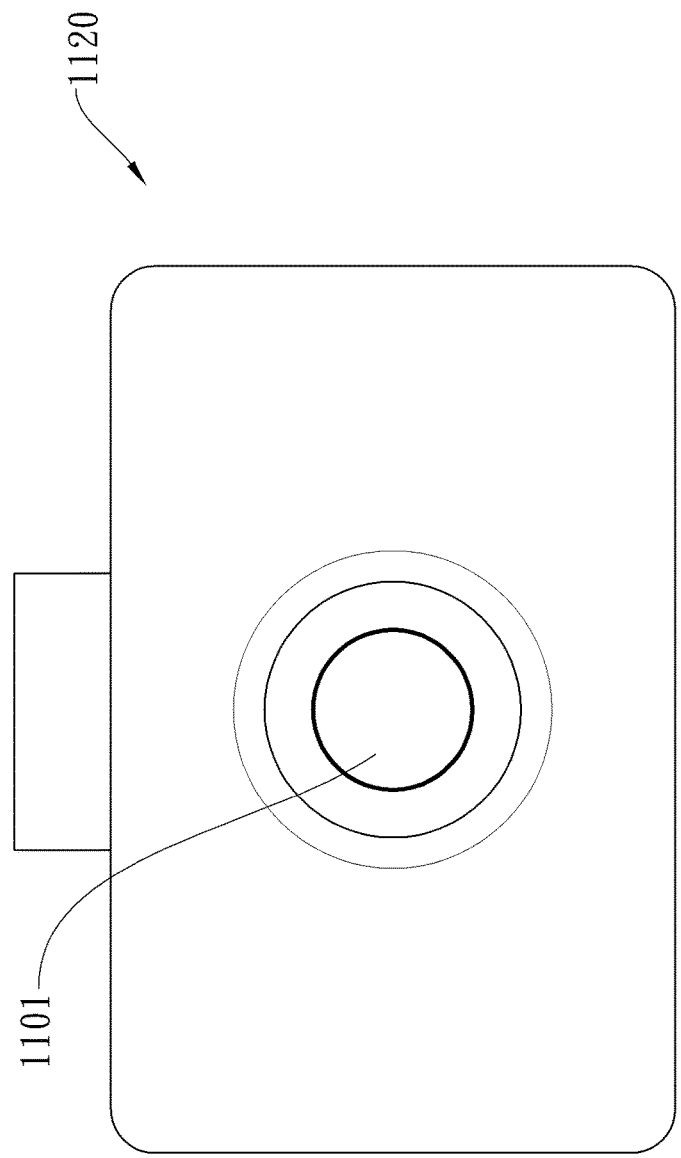
FIG. 11B shows a driving recording system with an image capturing apparatus of the present disclosure installed therein.
Figure 11C:
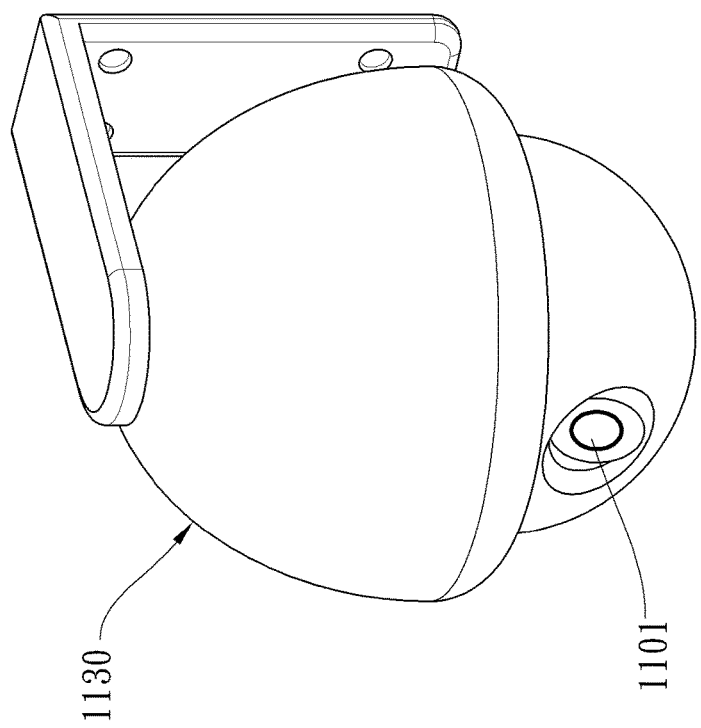
FIG. 11C shows a surveillance camera with an image capturing apparatus of the present disclosure installed therein.

FIG. 10A is a schematic view of an image capturing apparatus according to the 10th embodiment of the present disclosure. FIG. 10B shows, in order from left to right, longitudinal spherical aberration curves, astigmatic field curves and a distortion curve of the image capturing apparatus according to the 10th embodiment.

In FIG. 10A, the image capturing apparatus comprises an optical imaging lens assembly (not otherwise herein labeled) of the present disclosure and an image sensor 1090. The optical imaging lens assembly comprises, in order from an object side to an image side, a first lens element 1010, a second lens element 1020, a third lens element 1030, an aperture stop 1000, a fourth lens element 1040, a fifth lens element 1050, and a sixth lens element 1060.

The first lens element 1010 with negative refractive power has an object-side surface 1011 being convex in a paraxial region thereof and an image-side surface 1012 being concave in a paraxial region thereof, and the first lens element 1010 is made of glass.

The second lens element 1020 with negative refractive power has an object-side surface 1021 being convex in a paraxial region thereof and an image-side surface 1022 being concave in a paraxial region thereof, and the second lens element 1020 is made of glass.

The third lens element 1030 with positive refractive power has an object-side surface 1031 being concave in a paraxial region thereof and an image-side surface 1032 being convex in a paraxial region thereof, and the third lens element 1030 is made of glass.

The fourth lens element 1040 with positive refractive power has an object-side surface 1041 being concave in a paraxial region thereof and an image-side surface 1042 being convex in a paraxial region thereof, and the fourth lens element 1040 is made of glass.

The fifth lens element 1050 with positive refractive power has an object-side surface 1051 being convex in a paraxial region thereof and an image-side surface 1052 being convex in a paraxial region thereof, and the fifth lens element 1050 is made of glass.

The sixth lens element 1060 with positive refractive power has an object-side surface 1061 being convex in a paraxial region thereof and an image-side surface 1062 being concave in a paraxial region thereof, and the sixth lens element 1060 is made of glass.

The optical imaging lens assembly further comprises a filter 1070 located between the sixth lens element 1060 and an image surface 1080. The filter 1070 is made of glass and will not affect the focal length of the optical imaging lens assembly. The image sensor 1090 is disposed on or near the image surface 1080 of the optical imaging lens assembly.

The detailed optical data of the 10th embodiment are shown in TABLE 21, wherein the units of the curvature radius, the thickness and the focal length are expressed in mm, and HFOV is half of a maximum field of view.

TABLE 21

(10th Embodiment)
f = 1.62 mm, Fno = 2.85, HFOV = 83.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 19.783 | 2.261 | Glass | 1.718 | 54.5 | −3.14 |
| 2 | | 1.926 | 1.324 | | | | |
| 3 | Lens 2 | 22.816 | 1.677 | Glass | 1.657 | 32.3 | −32.38 |
| 4 | | 10.688 | 0.172 | | | | |
| 5 | Lens 3 | −52.228 | 1.364 | Glass | 1.821 | 23.8 | 7.25 |
| 6 | | −5.403 | 0.129 | | | | |
| 7 | Ape. Stop | Plano | 0.570 | | | | |
| 8 | Lens 4 | −8.338 | 2.425 | Glass | 1.790 | 46.5 | 7.73 |
| 9 | | −3.979 | 0.177 | | | | |
| 10 | Lens 5 | 9.757 | 2.597 | Glass | 1.727 | 53.3 | 9.10 |
| 11 | | −18.223 | 0.311 | | | | |
| 12 | Lens 6 | 4.186 | 1.995 | Glass | 1.695 | 20.0 | 22.06 |
| 13 | | 4.631 | 0.825 | | | | |
| 14 | Filter | Plano | 0.300 | Glass | 1.517 | 64.2 | — |
| 15 | | Plano | 0.361 | | | | |
| 16 | Image Surface | Plano | — | | | | |

Note:
Reference wavelength is 845.0 nm.

In the 10th embodiment, the equation of the aspheric surface profiles of the aforementioned lens elements is the same as the equation from the 1st embodiment. Also, the definitions of the parameters shown in TABLE 22 below are the same as those stated in the 1st embodiment, but the values for the conditions in the 10th embodiment are as specified below; an explanation in this regard will not be provided again.

TABLE 22

10th Embodiment

| | | | |
|---|---|---|---|
| f [mm] | 1.62 | SD/TD | 0.54 |
| Fno. | 2.85 | R11/R12 | 0.90 |
| HFOV [deg.] | 83.1 | |R4/R5| | 0.20 |
| λ [nm] | 845.0 | (R1 + R2)/(R1 − R2) | 1.22 |
| |1/tan(HFOV)| | 0.12 | (R7 + R8)/(R7 − R8) | 2.83 |
| (V2 + V3)/2 | 28.05 | (R1 + R12)/(R1 − R12) | 1.61 |
| CT3/CT2 | 0.81 | (R9 + R12)/(R9 − R12) | 2.81 |
| CT4/T23 | 14.10 | |f2/f5| | 3.56 |
| T23/T45 | 0.97 | f/T12 | 1.22 |
| ΣCT/ΣAT | 4.59 | f/EPD | 2.85 |
| BL/ΣAT | 0.55 | | |

The foregoing description, for purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly, comprising, in order from an object side to an image side:
    a first lens element having negative refractive power;
    a second lens element with negative refractive power having an object-side surface being convex in a paraxial region thereof and an image-side surface being concave in a paraxial region thereof;
    a third lens element having positive refractive power;
    a fourth lens element having positive refractive power;
    a fifth lens element having positive refractive power; and
    a sixth lens element having negative refractive power;
    wherein the optical imaging lens assembly has a total of six lens elements; and wherein a central thickness of the second lens element is CT2, a central thickness of the third lens element is CT3, a focal length of the optical imaging lens assembly is f, an axial distance between the first lens element and the second lens element is T12, an axial distance between the image-side surface of the sixth lens element and an image surface is BL, a sum of axial distances between respective two adjacent lens elements of the optical imaging lens assembly is ΣAT, an entrance pupil diameter of the optical imaging lens assembly is EPD, and the following conditions are satisfied:

$0 < CT3/CT2 < 1.0;$ $0 < f/T12 < 5.50;$ $0.15 < BL/\Sigma AT < 1.70;$ and $0.80 < f/EPD < 5.0.$ 2. The optical imaging lens assembly of claim 1, wherein the first lens element has an image-side surface being concave in a paraxial region thereof, the axial distance between the first lens element and the second lens element is T12, and T12 is the maximum axial distance among the axial distances between respective two adjacent lens elements.

3. The optical imaging lens assembly of claim 1, wherein a curvature radius of the object-side surface of the fourth lens element is R7, a curvature radius of the image-side surface of the fourth lens element is R8, and the following condition is satisfied:

$$-0.30 < (R7+R8)/(R7-R8) < 5.0.$$

4. The optical imaging lens assembly of claim 1, wherein a curvature radius of the object-side surface of the first lens element is R1, a curvature radius of the image-side surface of the sixth lens element is R12, and the following condition is satisfied:

$$-1.3 < (R1+R12)/(R1-R12) < 0.10.$$

5. The optical imaging lens assembly of claim 1, wherein a curvature radius of the object-side surface of the sixth lens element is R11, the curvature radius of the image-side surface of the sixth lens element is R12, and the following condition is satisfied:

$$-0.20 < R11/R12 < 0.34.$$

6. The optical imaging lens assembly of claim 1, wherein an axial distance between the second lens element and the third lens element is T23, an axial distance between the fourth lens element and the fifth lens element is T45, and the following condition is satisfied:

$$0.10 < T23/T45 < 3.50.$$

7. The optical imaging lens assembly of claim 1, wherein the focal length of the optical imaging lens assembly is f, the axial distance between the first lens element and the second lens element is T12, and the following condition is satisfied:

$$0 < f/T12 < 2.60.$$

8. The optical imaging lens assembly of claim 1, wherein the focal length of the optical imaging lens assembly is f, the entrance pupil diameter of the optical imaging lens assembly is EPD, a curvature radius of the image-side surface of the second lens element is R4, a curvature radius of the object-side surface of the third lens element is R5, and the following conditions are satisfied:

$$1.20 < f/EPD < 4.0; \text{ and}$$

$$|R4/R5| < 0.90.$$

9. The optical imaging lens assembly of claim 1, wherein an Abbe number of the second lens element is V2, an Abbe number of the third lens element is V3, and the following condition is satisfied:

$$(V2+V3)/2 < 33.5.$$

10. The optical imaging lens assembly of claim 1, wherein half of a maximum field of view of the optical imaging lens assembly is HFOV, and the following condition is satisfied:

$$|1/\tan(HFOV)| < 0.85.$$

11. The optical imaging lens assembly of claim 1, further comprising an aperture stop located between the third lens element and the fourth lens element, wherein an axial distance between the aperture stop and the image-side surface of the sixth lens element is SD, an axial distance between the object-side surface of the first lens element and the image-side surface of the sixth lens element is TD, and the following condition is satisfied:

$$0.25 < SD/TD < 0.58.$$

12. The optical imaging lens assembly of claim 1, wherein a wavelength of incident light entering the optical imaging lens assembly is λ, and the following condition is satisfied:

$$750 \text{ nm} < \lambda < 950 \text{ nm}.$$

13. An image capturing apparatus, comprising the optical imaging lens assembly of claim 1 and an image sensor.

14. An electronic device, comprising the image capturing apparatus of claim 13.

15. An optical imaging lens assembly, comprising, in order from an object side to an image side:
a first lens element having negative refractive power;
a second lens element with negative refractive power having an object-side surface being convex in a paraxial region thereof and an image-side surface being concave in a paraxial region thereof;
a third lens element having positive refractive power;
a fourth lens element having positive refractive power;
a fifth lens element having positive refractive power; and
a sixth lens element;
wherein the optical imaging lens assembly has a total of six lens elements; and wherein a central thickness of the second lens element is CT2, a central thickness of the third lens element is CT3, a central thickness of the fourth lens element is CT4, a focal length of the optical imaging lens assembly is f, an axial distance between the first lens element and the second lens element is T12, an axial distance between the second lens element and the third lens element is T23, and the following conditions are satisfied:

$$0 < CT3/CT2 < 1.0;$$

$$0 < f/T12 < 2.60; \text{ and}$$

$$0.70 < CT4/T23 < 15.0.$$

16. The optical imaging lens assembly of claim 15, wherein a curvature radius of the object-side surface of the first lens element is R1, a curvature radius of the image-side surface of the first lens element is R2, and the following condition is satisfied:

$$0 < (R1+R2)/(R1-R2) < 2.50.$$

17. The optical imaging lens assembly of claim 15, wherein a curvature radius of the object-side surface of the fourth lens element is R7, a curvature radius of the image-side surface of the fourth lens element is R8, and the following condition is satisfied:

$$-0.30 < (R7+R8)/(R7-R8) < 5.0.$$

18. The optical imaging lens assembly of claim 15, wherein a curvature radius of the object-side surface of the fifth lens element is R9, a curvature radius of the image-side surface of the sixth lens element is R12, and the following condition is satisfied:

$$-1.80 < (R9+R12)/(R9-R12) < 0.55.$$

19. The optical imaging lens assembly of claim 15, wherein a sum of central thicknesses of the first lens element, the second lens element, the third lens element, the fourth lens element, the fifth lens element, and the sixth lens element is ΣCT, a sum of axial distances between respective two adjacent lens elements of the optical imaging lens assembly is ΣAT, and the following condition is satisfied:

$$0.40 < \Sigma CT/\Sigma AT < 6.80.$$

20. The optical imaging lens assembly of claim 15, wherein a focal length of the second lens element is f2, a focal length of the fifth lens element is f5, and the following condition is satisfied:

$$1.70 < |f2/f5| < 8.0.$$

21. The optical imaging lens assembly of claim 15, wherein a curvature radius of the object-side surface of the sixth lens element is R11, the curvature radius of the image-side surface of the sixth lens element is R12, and the following condition is satisfied:

$$-0.20 < R11/R12 < 0.34.$$

22. The optical imaging lens assembly of claim 15, wherein the axial distance between the second lens element and the third lens element is T23, an axial distance between the fourth lens element and the fifth lens element is T45, and the following condition is satisfied:

$$0.10 < T23/T45 < 3.50.$$

23. The optical imaging lens assembly of claim 15, wherein the sixth lens element has negative refractive power, and the sixth lens element and the fifth lens element are cemented together.

24. The optical imaging lens assembly of claim 15, wherein an Abbe number of a lens element is V, and at least three lens elements in the optical imaging lens assembly satisfy the following condition: V<35.

25. The optical imaging lens assembly of claim 15, wherein half of a maximum field of view of the optical imaging lens assembly is HFOV, the optical imaging lens assembly further comprises an aperture stop located between the third lens element and the fourth lens element, and the following condition is satisfied:

$$|1/\tan(HFOV)| < 0.85.$$

* * * * *